United States Patent
Franklin et al.

(10) Patent No.: US 7,046,267 B2
(45) Date of Patent: May 16, 2006

(54) STRIPING AND CLIPPING CORRECTION

(75) Inventors: Kevin Franklin, San Diego, CA (US); Moses Derkalousdian, San Diego, CA (US); Steve Meyer, San Diego, CA (US)

(73) Assignee: Markem Corporation, Keene, NH (US)

( * ) Notice: Subject to any disclaimer, the term of this patent is extended or adjusted under 35 U.S.C. 154(b) by 0 days.

(21) Appl. No.: 10/741,930

(22) Filed: Dec. 19, 2003

(65) Prior Publication Data
US 2005/0134678 A1 Jun. 23, 2005

(51) Int. Cl.
B41J 2/435 (2006.01)

(52) U.S. Cl. .......................... 347/248; 347/234

(58) Field of Classification Search .............. 347/224, 347/229, 234–235, 248–250, 262, 264; 219/121.6–121.61, 219/121.78, 121.79, 121.8, 121.82, 161.67–121.69, 219/653; 235/494; 358/448
See application file for complete search history.

(56) References Cited

U.S. PATENT DOCUMENTS

| 3,571,554 A | 3/1971 | Baujoin |
| 3,648,601 A | 3/1972 | Weidman |
| 3,714,393 A | 1/1973 | Johnson et al. |
| 3,725,655 A | 4/1973 | Edstrom et al. |
| 3,761,675 A | 9/1973 | Mason et al. |
| 3,803,637 A | 4/1974 | Martin et al. |
| 3,824,015 A | 7/1974 | Petit et al. |
| 3,848,104 A | 11/1974 | Locke |
| 3,863,565 A | 2/1975 | Patykula |
| 3,885,873 A | 5/1975 | Andermo |
| 3,898,417 A | 8/1975 | Atkinson |
| 3,975,261 A | 8/1976 | Beck |
| 4,011,437 A | 3/1977 | Hohn |
| 4,024,545 A | 5/1977 | Dowling et al. |
| 4,025,752 A | 5/1977 | Whitman, III |
| 4,049,945 A | 9/1977 | Ehlscheid et al. |
| 4,063,064 A | 12/1977 | Saunders et al. |
| 4,065,212 A | 12/1977 | Belleson et al. |
| 4,083,053 A | 4/1978 | Ouchi et al. |
| 4,086,522 A | 4/1978 | Engelberger et al. |
| 4,088,864 A | 5/1978 | Theeuwes et al. |
| 4,099,830 A | 7/1978 | Whittle et al. |
| 4,100,599 A | 7/1978 | Nally |
| 4,106,965 A | 8/1978 | Lee |
| 4,154,530 A | 5/1979 | Connolly, Jr. et al. |
| 4,160,894 A | 7/1979 | Stemmler et al. |
| 4,207,985 A | 6/1980 | Lockett et al. |
| 4,218,606 A | 8/1980 | Whitman, III |
| 4,240,017 A | 12/1980 | Uekusa |

(Continued)

FOREIGN PATENT DOCUMENTS

DE 400476 4/1922

(Continued)

OTHER PUBLICATIONS

Allen, L. "Automatic Identification: How Do You Choose It, & Where Do You Use It ?", *Automation*, Jul., 1991.

(Continued)

*Primary Examiner*—Hai Pham
(74) *Attorney, Agent, or Firm*—Fish & Richardson P.C.

(57) ABSTRACT

A method of controlling a laser to print symbols of an image on moving products with various velocities. The method may include grouping, organizing and/or moving symbols to stripes, leading edge clipping correction, trailing edge clipping correction and updating clipping correction in real-time.

43 Claims, 27 Drawing Sheets

U.S. PATENT DOCUMENTS

| | | | |
|---|---|---|---|
| 4,271,968 A | 6/1981 | Mehrkame et al. |
| 4,283,145 A | 8/1981 | Miyazawa |
| 4,285,012 A | 8/1981 | Ohara et al. |
| 4,297,559 A | 10/1981 | Whitman, III |
| 4,307,282 A | 12/1981 | Gappa |
| 4,319,122 A | 3/1982 | Pope et al. |
| 4,323,755 A | 4/1982 | Nierenberg |
| 4,334,471 A | 6/1982 | Noyes et al. |
| 4,338,114 A | 7/1982 | Brockway et al. |
| 4,338,147 A | 7/1982 | Backstrom et al. |
| 4,354,196 A | 10/1982 | Neumann et al. |
| 4,371,782 A | 2/1983 | Brouwer |
| 4,375,025 A | 2/1983 | Carlson |
| 4,404,454 A | 9/1983 | Taylor et al. |
| 4,468,551 A | 8/1984 | Neigeisel |
| 4,480,169 A | 10/1984 | Macken |
| 4,497,995 A | 2/1985 | Nilsen |
| 4,517,436 A | 5/1985 | Lawrence |
| 4,557,386 A | 12/1985 | Buckley et al. |
| 4,560,856 A | 12/1985 | Miller et al. |
| 4,564,739 A | 1/1986 | Mattelin |
| 4,576,286 A | 3/1986 | Buckley et al. |
| 4,578,329 A | 3/1986 | Holsappel |
| 4,584,455 A | 4/1986 | Tomizawa |
| 4,587,396 A | 5/1986 | Rubin |
| 4,590,859 A | 5/1986 | Pou et al. |
| 4,618,759 A | 10/1986 | Muller et al. |
| 4,626,649 A | 12/1986 | Dupeyrat |
| 4,626,656 A | 12/1986 | Ootsuka et al. |
| 4,636,043 A | 1/1987 | Bellar |
| 4,638,144 A | 1/1987 | Latta, Jr. |
| 4,652,722 A | 3/1987 | Stone et al. |
| 4,675,498 A | 6/1987 | Lemelson |
| 4,695,698 A | 9/1987 | Mayor et al. |
| 4,696,143 A | 9/1987 | Young |
| 4,703,166 A | 10/1987 | Bruning |
| 4,707,596 A | 11/1987 | Hohberg |
| 4,707,709 A | 11/1987 | Tsilibes |
| 4,720,618 A | 1/1988 | Stamer et al. |
| 4,725,709 A | 2/1988 | Mattelin |
| 4,727,235 A | 2/1988 | Stamer et al. |
| 4,734,558 A | 3/1988 | Nakano et al. |
| 4,736,187 A | 4/1988 | Kibrick et al. |
| 4,742,206 A | 5/1988 | Dietterich et al. |
| 4,758,703 A | 7/1988 | Drever et al. |
| 4,769,310 A | 9/1988 | Gugger et al. |
| 4,791,267 A | 12/1988 | Yokoyama et al. |
| 4,796,038 A | 1/1989 | Allen et al. |
| 4,797,532 A | 1/1989 | Maiorov |
| 4,799,215 A | 1/1989 | Suzuki |
| 4,803,336 A | 2/1989 | Myer |
| 4,806,727 A | 2/1989 | Ruckl |
| 4,808,790 A | 2/1989 | Ruckl |
| 4,822,973 A | 4/1989 | Fahner et al. |
| 4,852,020 A | 7/1989 | Morita |
| 4,854,696 A | 8/1989 | Guez |
| 4,861,620 A | 8/1989 | Azuma et al. |
| 4,870,623 A | 9/1989 | Buckley et al. |
| 4,874,919 A | 10/1989 | Bransden et al. |
| 4,901,073 A | 2/1990 | Kibrick |
| 4,906,813 A | 3/1990 | Gajdos |
| 4,914,437 A | 4/1990 | Kibrick et al. |
| 4,918,284 A | 4/1990 | Weisz |
| 4,941,082 A | 7/1990 | Pailthorp et al. |
| 4,952,789 A | 8/1990 | Suttie |
| 4,956,539 A | 9/1990 | Uesugi et al. |
| 4,965,829 A | 10/1990 | Lemelson |
| 4,969,134 A | 11/1990 | Balderson |
| 4,970,366 A | 11/1990 | Imatou et al. |
| 4,970,600 A | 11/1990 | Garnier et al. |
| 4,987,287 A | 1/1991 | Jack |
| 5,021,631 A | 6/1991 | Ravellat |
| 5,041,716 A | 8/1991 | Wakabayashi |
| 5,049,721 A | 9/1991 | Parnas et al. |
| 5,051,558 A | 9/1991 | Sukhman |
| 5,087,805 A | 2/1992 | Silverschotz et al. |
| 5,109,149 A | 4/1992 | Leung |
| 5,120,928 A | 6/1992 | Piliero |
| 5,132,510 A | 7/1992 | Klingel et al. |
| 5,166,505 A | 11/1992 | Gorriz et al. |
| 5,168,454 A | 12/1992 | LaPlante et al. |
| 5,170,279 A | 12/1992 | Schwartz et al. |
| 5,175,425 A * | 12/1992 | Spratte et al. ............... 235/494 |
| 5,206,496 A | 4/1993 | Clement et al. |
| 5,229,573 A | 7/1993 | Stone et al. |
| 5,229,574 A | 7/1993 | Stone |
| 5,262,613 A | 11/1993 | Norris et al. |
| 5,283,773 A | 2/1994 | Thomas et al. |
| 5,294,942 A | 3/1994 | Loewenthal et al. |
| 5,327,529 A | 7/1994 | Fults et al. |
| 5,329,090 A | 7/1994 | Woelki et al. |
| 5,367,152 A | 11/1994 | Krichever et al. |
| 5,375,722 A | 12/1994 | Leary et al. |
| 5,401,960 A | 3/1995 | Fisun et al. |
| 5,515,480 A | 5/1996 | Frazier |
| 5,605,641 A | 2/1997 | Chiba et al. ............ 219/121.68 |
| 5,653,900 A | 8/1997 | Clement et al. |
| 5,680,384 A | 10/1997 | Seki et al. |
| 5,734,412 A | 3/1998 | Hasebe et al. ............... 347/247 |
| 5,751,436 A | 5/1998 | Kwon et al. |
| 5,767,483 A | 6/1998 | Cameraon et al. |
| 5,900,948 A * | 5/1999 | Shigeeda et al. ............ 358/448 |
| 5,906,609 A | 5/1999 | Assa et al. |
| 5,938,657 A | 8/1999 | Assa et al. |
| 5,966,457 A | 10/1999 | Lemelson |
| 5,990,444 A | 11/1999 | Gostin |
| 6,049,055 A | 4/2000 | Fannash et al. |
| 6,061,081 A | 5/2000 | Hasebe et al. ............... 347/247 |
| 6,121,067 A | 9/2000 | Canella |
| 6,121,574 A | 9/2000 | Xu |
| 6,160,835 A | 12/2000 | Kwon |
| 6,424,430 B1 | 7/2002 | Bilodeau et al. |
| 6,433,303 B1 | 8/2002 | Liu et al. |
| 6,518,540 B1 | 2/2003 | Wee et al. |
| 6,681,055 B1 | 1/2004 | Sato |
| 6,734,392 B1 * | 5/2004 | Philipp et al. ......... 219/121.82 |
| 6,791,592 B1 | 9/2004 | Assa et al. |
| 2003/0011672 A1 | 1/2003 | Emge et al. |

FOREIGN PATENT DOCUMENTS

| | | |
|---|---|---|
| DE | 243 798 A1 | 11/1987 |
| EP | 0 141 724 B1 | 5/1985 |
| EP | 0 168 351 A1 | 1/1986 |
| EP | 0 168 351 B1 | 1/1986 |
| EP | 0 176 872 A1 | 4/1986 |
| EP | 0 215 389 B1 | 3/1987 |
| EP | 0 233 146 A1 | 8/1987 |
| EP | 0 233 146 B1 | 8/1987 |
| EP | 0 244 574 A1 | 11/1987 |
| EP | 0 262 225 A1 | 4/1988 |
| EP | 0 276 995 B1 | 8/1988 |
| EP | 0 316 347 B1 | 5/1989 |
| EP | 0 391 539 A2 | 10/1990 |
| EP | 0 391 540 A2 | 10/1990 |
| EP | 0 400 476 A2 | 12/1990 |
| EP | 0 419 377 A1 | 3/1991 |
| EP | 0 420 198 B1 | 4/1991 |
| EP | 0 446 482 A1 | 9/1991 |
| EP | 0 446 887 A1 | 9/1991 |
| EP | 0 453 733 A1 | 10/1991 |
| EP | 0 464 270 A1 | 1/1992 |
| EP | 0 495 647 B1 | 7/1992 |
| EP | 0 516 199 A1 | 12/1992 |

| | | |
|---|---|---|
| EP | 0 519 391 A1 | 12/1992 |
| EP | 0 531 565 A1 | 3/1993 |
| EP | 0 531 584 A1 | 3/1993 |
| EP | 0 402 298 B1 | 7/1993 |
| EP | 0 729 806 A1 | 9/1996 |
| EP | 0 729 906 B1 | 6/2000 |
| ES | 2 013 193 | 4/1990 |
| FR | 2 271 683 | 12/1975 |
| FR | 2 450 455 | 9/1980 |
| GB | 1 360 380 | 7/1974 |
| GB | 1 450 251 | 9/1976 |
| GB | 1 467 152 | 3/1977 |
| GB | 1 541 214 | 2/1979 |
| GB | 2 059 354 A | 4/1981 |
| GB | 2 073 639 A | 10/1981 |
| GB | 2 078 621 A | 1/1982 |
| GB | 2 126 955 A | 4/1984 |
| GB | 2 131 417 A | 6/1984 |
| GB | 2 133 180 A | 7/1984 |
| GB | 2 133 352 A | 7/1984 |
| GB | 2 157 851 A | 10/1985 |
| GB | 2 169 282 A | 7/1986 |
| GB | 2 202 647 A | 9/1988 |
| GB | 2 229 389 A | 9/1990 |
| GB | 2 247 677 A | 3/1992 |
| GB | 2 252 068 A | 7/1992 |
| GB | 2 253 282 A | 9/1992 |
| JP | 5229740 | 3/1977 |
| JP | 5511824 | 1/1980 |
| JP | 5714981 | 1/1982 |
| JP | 5781984 | 5/1982 |
| JP | 5796865 | 6/1982 |
| JP | 5942194 | 3/1984 |
| JP | 5945091 | 3/1984 |
| JP | 5973191 | 5/1984 |
| JP | 59207246 | 11/1984 |
| JP | 60106686 | 6/1985 |
| JP | 60227994 | 11/1985 |
| JP | 63248589 | 10/1988 |
| JP | 63174314 | 11/1988 |
| JP | 2863872 | 12/1988 |
| JP | 6411083 | 1/1989 |
| JP | 1166893 | 6/1989 |
| JP | 215887 | 1/1990 |
| JP | 2187288 | 7/1990 |
| JP | 2187289 | 7/1990 |
| JP | 2217186 | 8/1990 |
| JP | 376677 | 4/1991 |
| JP | 5169286 | 7/1993 |
| WO | WO 81/01889 | 7/1981 |
| WO | WO 82/00635 | 3/1982 |
| WO | WO 85/00123 | 1/1985 |
| WO | WO 86/04549 | 8/1986 |
| WO | WO 89/01385 | 2/1989 |
| WO | WO 90/00459 | 1/1990 |
| WO | WO 90/04223 | 4/1990 |
| WO | WO 91/04828 | 4/1991 |
| WO | WO 91/12923 | 5/1991 |
| WO | WO 92/04155 | 3/1992 |
| WO | WO 92/09399 | 6/1992 |
| WO | WO 92/12820 | 8/1992 |
| WO | WO 93/15029 | 8/1993 |

OTHER PUBLICATIONS

Dambrot, S. "Applications Drive Japan's Laser Industry", *Photonics*, Jul., 1992.
Inglesby, T. "Printers on the Floor and in the Bars", *Manufacturing Systems*, Feb., 1992.
Kirkland, C. "Hydraulic Pumps: Fixed vs. Variable Volume", *Plastics World*, Oct., 1991.
LaCosse, D. "Manufacturing Begins With Product Marking", *Automation*, Sep., 1988.
Lang, N. "Packaging Parade", *Beverage World*, Jan., 1991.
Makadok, S. "Production Realities: Faster, Smarter a Must", *Beverage Industry*, vol. 83, No. 12, Dec., 1992.
Mark, "Lasers Help Capacitor Maker Gain Good Marks", *Production Engineering*, Jul., 1983.
Mikami, T. et al., "A Correction Method for Laser Scanning Errors in High Speed Laser Printers", *Fujitsu*, vol. 18, No. 4, 1982.
Redmond, B. "Demand Calls the Tune", *Materials Handling News*, Jul., 1985.
Samuels, M. "PLC and PC Join to Automate Laser Assembly", *Production Engineering*, Mar., 1987.
Seidemen, T. "BC Labels Turn High-Tech", http://web4.infotrac.galegroup.com, vol. 92, No. 1, p. 83(2), Jan., 1993.
Spencer, J. "Labeling & Marking", *Handling and Shipping Management*, Jan., 1983.
Stovicek, D. "No Longer Science Fiction, Lasers are Now a Part of Every Day Life in Industry", *Automation*, Aug., 1989.
"What's Ahead in Marking and Labeling", *Modern Materials Handling*, Oct., 1985.
"ProLase for Window's 95 Features", http://laserware.com/95Features.html, retrieved Oct. 6, 2000.
"CLC ControlLaser Corporation", printout Mar. 6, 2000.
"Industrial Dynamics Offers the Lasetec Laser Printer for Higher Quality Product Information and Codes at High Speeds on Bottles, Cans, Packages", http://www.filtec.com/newpage1.htm, 1999-2000, retrieved on Oct. 6, 2000.
"Overview of WinLaseNT™ Marker Suite", http://www.alase.com/software/software.html, retrieved Oct. 6, 2000.
"SCAN jet", http://www.scanlab.de/jetmain.html, retrieved Oct. 6, 2000.
"SCANjet—more information", http://www.scanlab.de/jetmain2.html, retrieved Oct. 6, 2000.
"LaserPro DM Laser Coding System", http://www.marconidata.com/products/prod_laserpro_dm.html, 1997-2000, retrieved Oct. 7, 2000.
"Videojet Announces New Position in Laser Coding Market", Press Release, http://www.marconidata.com/press/laser_pr.html, 1997-1999, retrieved Oct. 7, 2000.
MIKOH Corporation Limited, http://www.mikoh.com/index.html, retrieved Oct. 6, 2000.
"Beam-Steered Laser Marking on Parts in Motion", http://www.semiconductorfabtech.com/features/tap_old/articles/06.427.html, retrieved Oct. 6, 2000.
"Laser Systems—Medical Device Manufaturing", http://www.gsilumonics.com/markets%5Fframe/medical/marking.htm, GSI Lumonics 2000, retrieved Oct. 6, 2000.
Front Range Laser, http://www.frontrangelaser.net/products.htm, Jun. 9, 2000, retrieved Oct. 7, 2000.
Laser Technology Centre company description, http://www.hi-laser.com/eng/about/about.htm, 2000, retrieved Oct. 7, 2000.
BetaMark-2000 product description, http://www.hi-laser.com/eng/equipment/betamark2000.htm, retrieved Oct. 7, 2000.
Solaris Laser S.A., http://www.solarislaser.com.pl/index.htm, retrieved Oct. 7, 2000.
"Coming Soon! The FH-Series "Tracker" Marking Head", http://www.winmarkpro.com/PressRelease/Tracker.htm, Mar. 2000, retrieved Oct. 6, 2000.
"FH-Series Marking Head", http://www.winmarkpro.com/Products/marking.htm, retrieved Oct. 6, 2000.

FH Series Marking Head, Marking Specifications, http://www.winmarkpro.com/Products/FHSpecs.html, retrieved Oct. 6, 2000.

"SolarJet: Laser Marking 'On the Fly' System for High Speed Package Coding", http://www.wlsc.com/solarjet.htm, retrieved Oct. 7, 2000.

Industrial Laser Source, "Software for High Speed Galvonometer.Scanner for Marking or Cutting on the Fly", http://www.lasertubes.com/software.htm, retrieved Oct. 7, 2000.

* cited by examiner

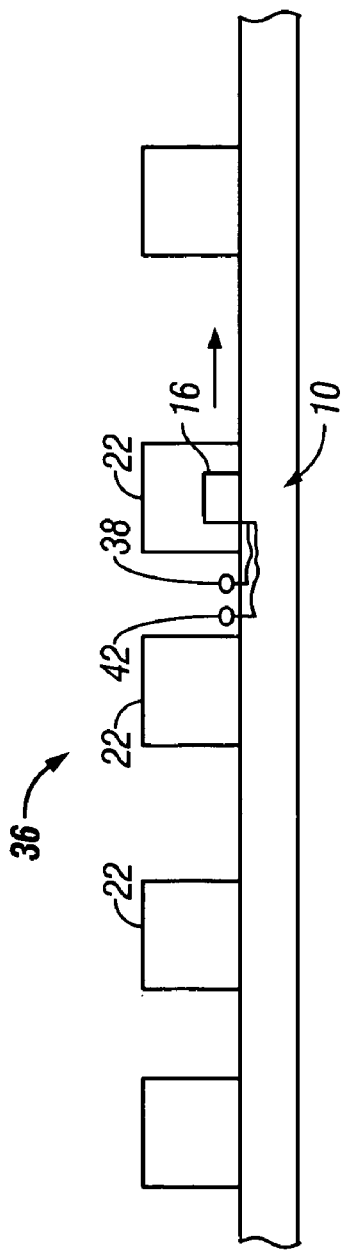
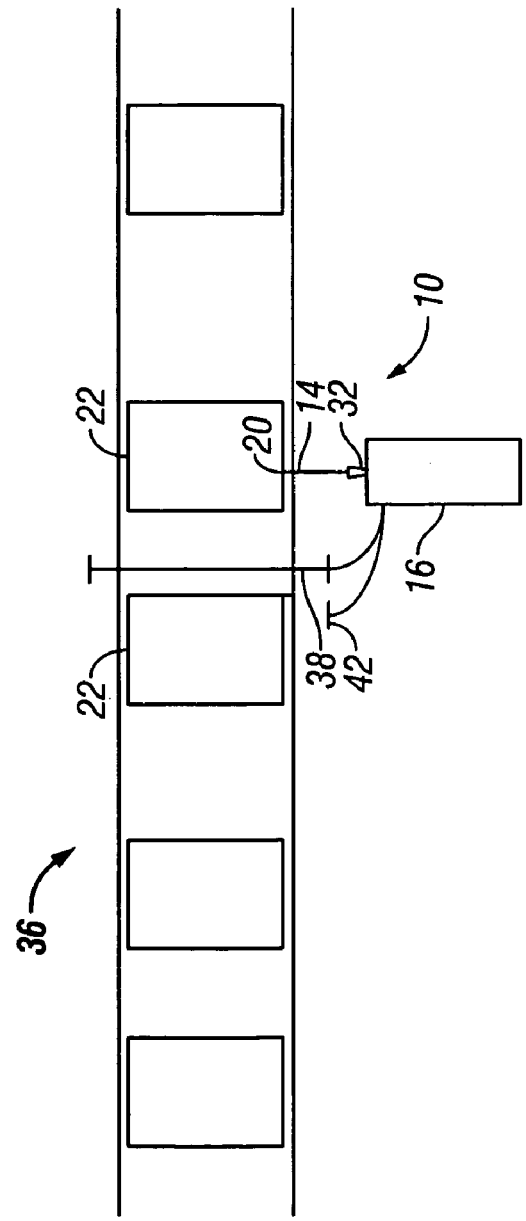

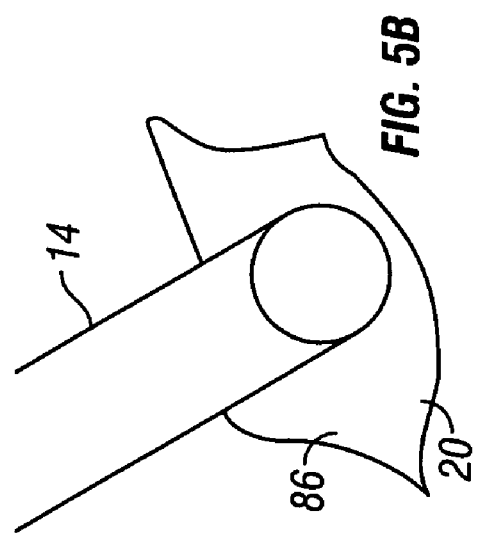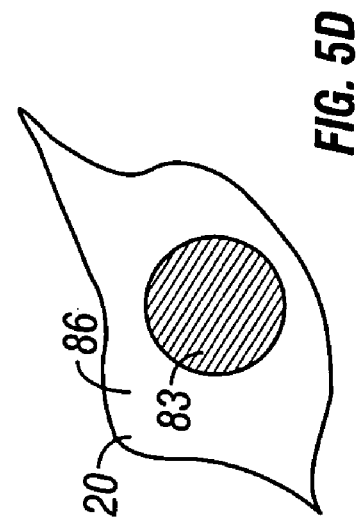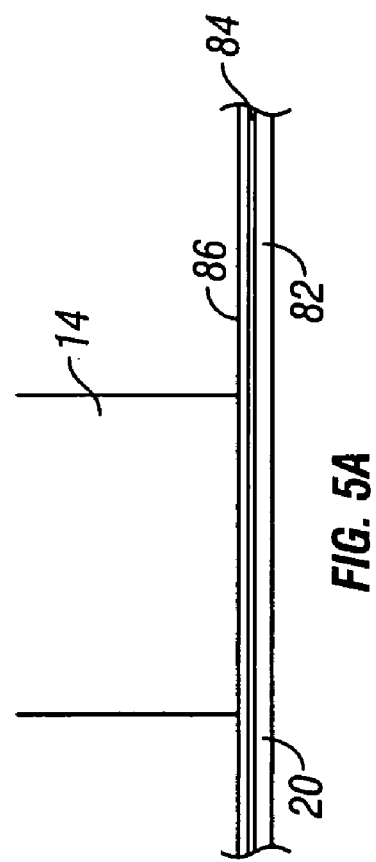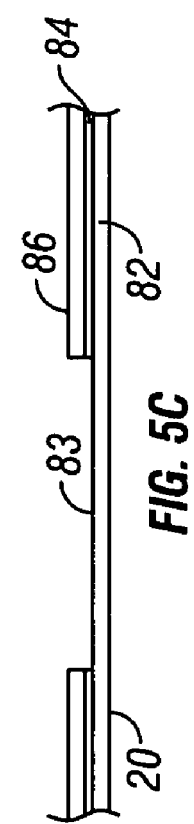

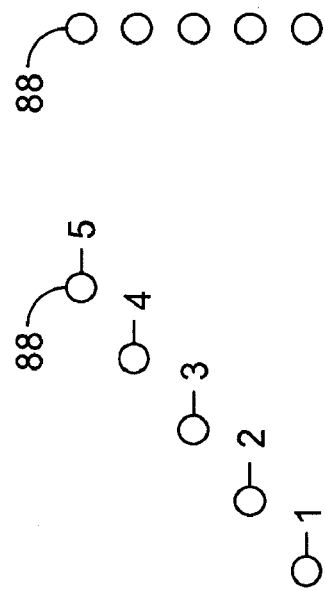
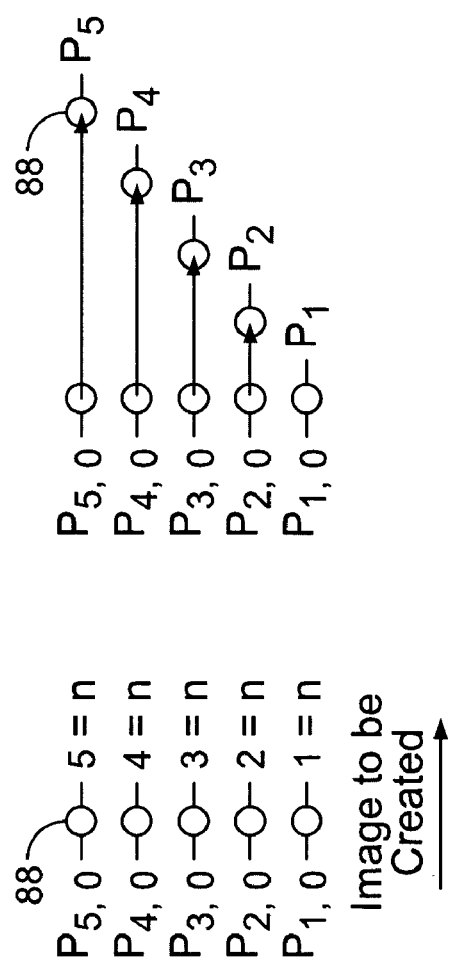
FIG. 9D
FIG. 9C
FIG. 9B
FIG. 9A

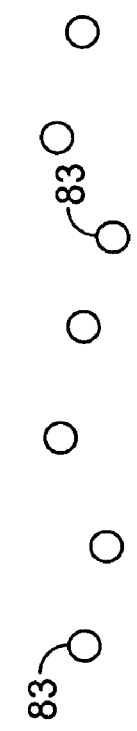
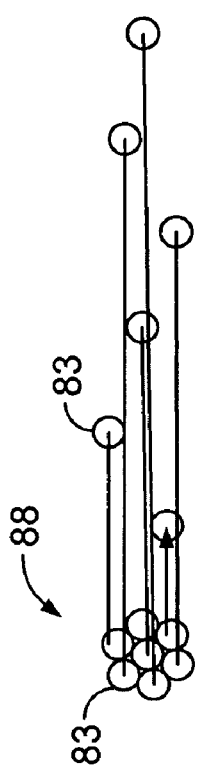
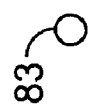
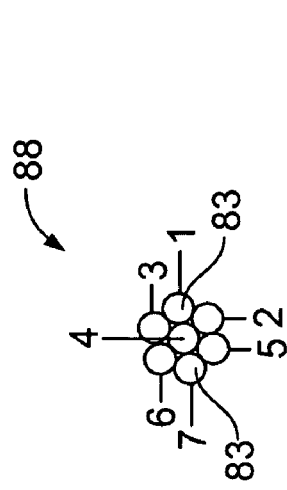
FIG. 10B
FIG. 10E
FIG. 10D
FIG. 10A
FIG. 10C

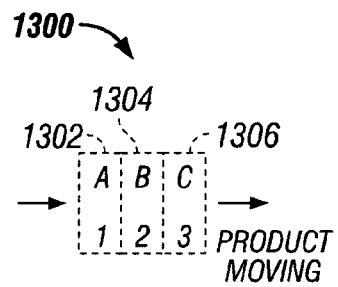
FIG. 13A
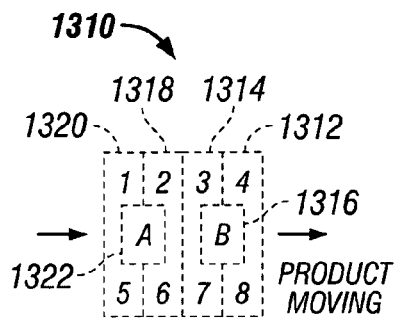
FIG. 13B
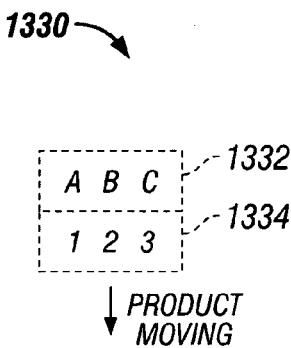
FIG. 13C
INTENDED IMAGE
1 2 3 4
|←→|
$S_0$
FIG. 14A
CLIPPED IMAGE
PRINTED
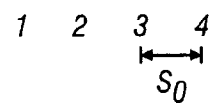
FIG. 14B

CORRECTED IMAGE WITH
CLIPPING CORRECTION PRINTED

CORRECTED IMAGE WITH
CLIPPING CORRECTION AND
UPDATED CLIPPING CORRECTION
PRINTED

UPDATED CLIPPING
CORRECTION

STRIPING AND CLIPPING CORRECTION

BACKGROUND

Modern production practices often involve printing an identification code on commercial products. These codes are easily observed on common products such as soda cans, cosmetics, pet food containers, etc. Some government regulatory agencies, such as the Food and Drug Administration, may require certain products to have such codes.

These codes often include information that is unique to the time and place at which the product is manufactured. For instance, many codes communicate a batch number associated with a product. Many codes go further and indicate the actual time and date of manufacture. Because some codes relate to unique manufacturing parameters (e.g., time and date), some codes cannot be pre-printed on a label for a product. Hence, a code is often printed on the label after the product is manufactured. Current code printing technology includes the use of ink jets, which spray ink onto the label.

SUMMARY

The present application relates to a printing system that uses a laser to print an image (e.g., code/sequence of symbols and characters) on a moving product. Specifically, the application relates to software or firmware in the printing system that organizes an image to a sequence of "stripes" and prints the stripes on the moving product. The software uses the stripes to provide an efficient print order of characters and symbols, which may speed up printing. The software may optimize use of the laser's exposure window (aperture) and minimize an amount of laser deflection motion between marking operations.

Image clipping occurs when a full image cannot be printed because a product is moving too fast or too slow, and the aperture limits the laser beam path. The software may select in real time an optimum position on the product to print one or more symbols. The software may use the stripes to provide real-time "leading edge" image clipping correction to print stripes on products moving at high speeds. The software may use the stripes to provide real-time "trailing edge" clipping correction to print stripes on products moving at slow speeds or to print long codes. The software may also provide real-time clipping correction updates. Thus, the software may ensure that an entire code will be printed on the product and attempts to maintain legibility of the printed code.

Clipping correction enables the printing system to successfully print desired images on slow products, fast products, and products with changing velocities without controlling the product's speed.

Striping and clipping correction allows the printing system to print more complex images (codes) and longer images on products, such as images that are longer than the aperture. Clipping correction may enable printing very long sequences of symbols.

Clipping correction may enable a laser to be mostly centered in an aperture during printing. Optical power loss may be at a minimum in the center of the aperture. Remaining mostly centered may lead to more consistent laser marking.

The software may be CIJ (character ink jet) compatible.

An aspect of the application relates to a system comprising a laser source, an input module, and a processor. The laser source prints an image on a moving object. The input module receives information identifying a velocity of the moving object and a location of the moving object. The processor performs operations including: separating an image to be printed on the moving object into a plurality of stripes that collectively represent the image to be printed; based on one or more of (a) the velocity of the moving object, (b) the location of the moving object, and (c) a parameter of a stripe to be printed, determining at least one of a time to print the stripe and a location on the moving object at which to print the stripe; and controlling the laser source to print the stripe on the moving object according to the time and location values.

Another aspect relates to a system comprising: a first module to organize an image to a plurality of stripes; a second module to receive the stripes, a trigger input and a velocity input to determine at least one of (a) locations on a moving object to print the stripes, and (b) a time at which to print at least one stripe on the moving object; and a laser source to print the stripes on the moving object.

Another aspect relates to a method comprising: organizing an image to be printed into a plurality of stripes that collectively represent the image; based on one or more of (a) a velocity of a moving object, (b) a location of the moving object, and (c) a parameter of a stripe to be printed, determining at least one of a time to print the stripe and a location on the moving object at which to print the stripe; and printing the stripe with a laser beam on the moving object based on the determined time to print and the location.

Details one or more implementations are set forth in the accompanying drawings and the description below. Other features and advantages may be apparent from the description, drawings and/or claims.

BRIEF DESCRIPTION OF THE DRAWINGS

FIG. 3B is a side view of a printing system used in conjunction with a product line which continuously moves a product in front of the printing system.

FIG. 3C is a top view of the printing system of FIG. 3B used in conjunction with a product line which continuously moves the product in front of the printing system.

FIG. 5A is a side view of a printing beam being incident on a material at a location where a spot is to be formed on the material.

FIG. 5B is a perspective view of a printing beam being incident on a material at a location where a spot is to be formed on the material.

FIG. 5C is a side view of a material after the printing beam has formed a spot in the material.

FIG. 5D is a perspective view of a material after the printing beam has formed a spot in the material.

FIG. 9A illustrates conversion of a code to a corrected code.

FIG. 9B illustrates a code being organized to a corrected code.

FIG. 9C illustrates the corrected code of FIG. 9C.

FIG. 9D illustrates the code formed on the product after the corrected code of FIG. 9C is printed on the product while the product is continuously moved past the printing system.

FIG. 10A illustrates conversion of a pixel to a corrected pixel.

FIG. 10B illustrates the corrected pixel of FIG. 10A.

FIG. 10C illustrates the pixel formed on the product after the corrected pixel of FIG. 10B is printed on the product while the product is continuously moved past the printing system.

FIG. 10D illustrates a spot formed on a stationary product.

FIG. 10E illustrates the spot of FIG. 10D formed on a product as the product is moving.

FIGS. 13A–13C illustrate examples of stripes created by the image processing module of FIG. 12.

FIG. 14A illustrates an example of an desired image to be printed.

FIG. 14B illustrates an example of a clipped printed image affected by "leading edge" clipping.

DETAILED DESCRIPTION

Figure 1:
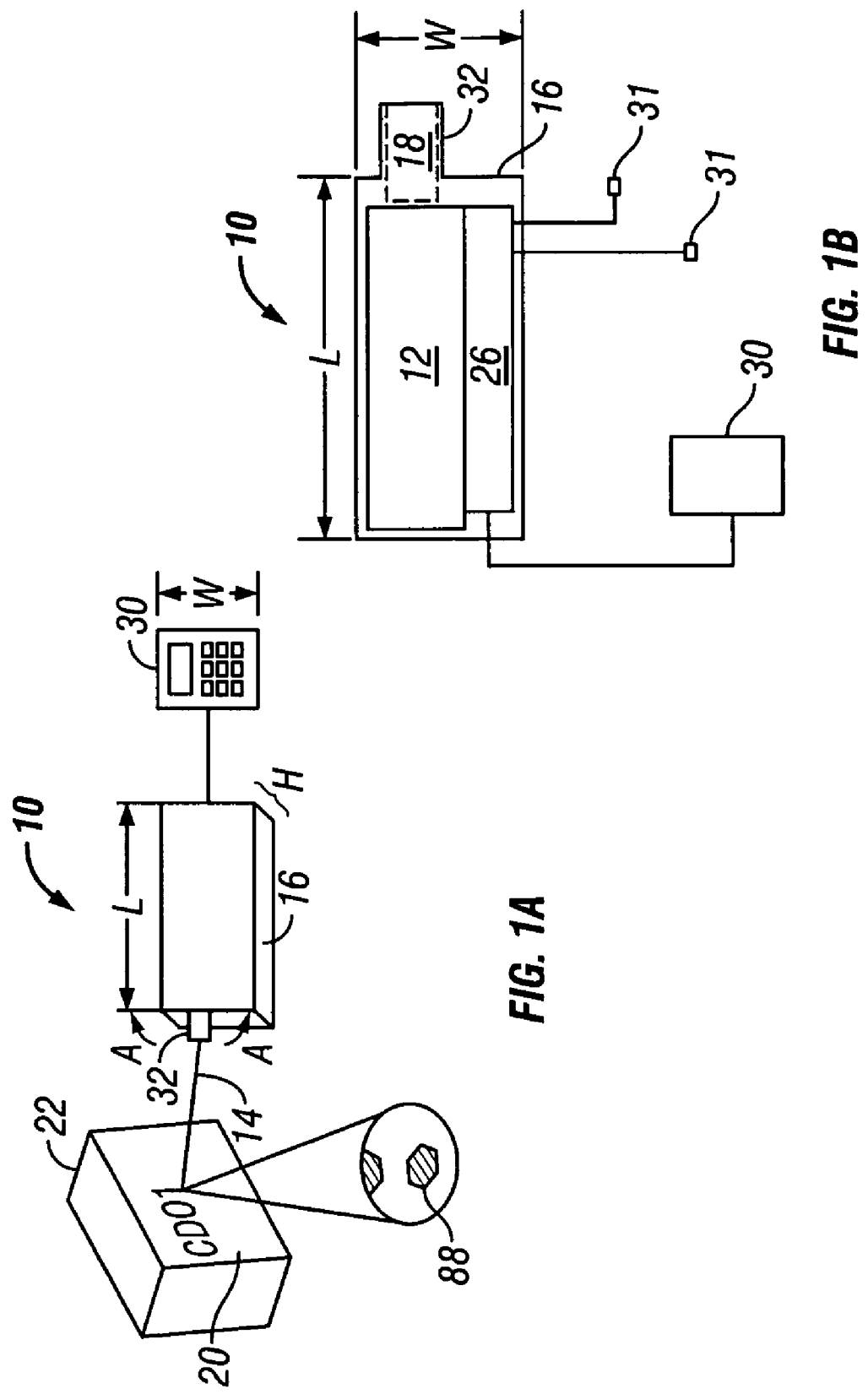
FIG. 1A is a side view of a printing system.
FIG. 1B is a cross-section of the printing system of FIG. 1A looking down on to the printing system.

The application relates to a printing system for printing a code on a product positioned adjacent to the printing system. In particular, the application relates to an optics assembly, such as low angle optics and reversed optics, in the printing system. The printing system includes a laser for producing a printing beam. The optics assembly steers the printing beam from one location to another location on the product. The printing system includes electronics for adjusting the time that the printing beam dwells at each location. This "dwell time" is adjusted such that the printing beam causes a spot to be formed at each location.

The locations can be arranged such that the spots form a pixel on the product. The pixels in turn can be arranged to form the symbols of a code. The symbols of the code can be the symbols which are available in word processing programs such as alphanumeric symbols and any other symbols used to identify a product batch, date, etc. The code can be readable text such as product names or identifiers. The code need not be alphanumeric and can include symbols which are not produced by typical word processing programs. For instance, the code can be a bar code.

The products for use with the printing system can be products to be sold retail or packaging of retail products. Further, the products can be products which are sold to other businesses. Examples of products include pharmaceuticals, pharmaceutical packaging, food packaging, cosmetics, food such as eggs, dairy products, ice cream, computer components, automotive components, medical devices, detergents and beverages such as soft drinks and wines.

The code can be formed in multiple locations on a product. For instance, plastic medicine bottles can have one code printed directly on the plastic bottle and another code formed on the label attached to the plastic bottle.

As described above, the code is constructed from a plurality of spots. The spot is formed on the product by altering an optical characteristic of the material at the location where the printing beam is incident on the product. The printing beam can alter a variety of optical characteristics of a product. For instance, the printing beam can cause one or more layers of material to be ablated so the underlying layers are visible. Since upper layers of a material often have an ink layer on paper, removal of the ink layer leaves a spot where the paper is visible against the surrounding ink layer. The refractive characteristics of a material can also be altered. For instance, the printing beam can be used to print a code on a plastic such as a soft drink bottle. The printing beam alters the refractive characteristics of the plastic. The code is easily visible since the eye can pick up the sections having contrasting refractive properties. In addition, the printing beam can etch certain materials.

Since the printing system employs a laser in order to print on the product, there is no need for consumables such as inks and solvents. Accordingly, the printing system can reduce the costs and complexity associated with printing a code on a product.

Traditional printing systems which employ a laser for printing a code on a product typically employ high powered lasers which often require liquid cooling and large amounts of space. However, in the printing system described below, the time that a laser dwells at each location can be increased to compensate for reductions in the power of the laser. As a result, a low powered laser can be employed in the printing system. For instance, in one embodiment, the laser is a $CO_2$ air cooled laser. In some instances the laser is at most a 25 Watt laser, in other instances the laser is at most a 20 Watt laser, in other instances the laser is at most a 15 Watt laser and in still other instances the laser is at most a 13 Watt laser.

Because the laser can be a low power laser, the laser, optics assembly and associated electronics can be mounted in a housing having a size on the order of an ink jet printer. As a result, the ability to adjust the dwell time means that the printing system according to the present overcomes the size and space challenges associated with traditional printing systems which employ a laser. Hence, the printing system described below is an improved substitute for ink jets used to print codes on products.

The printing system may be suitable for printing on products that are moving such as the products in a production line. Because these products are moving relative to the system, there is a limited amount of time available for printing on each product. The printing system includes electronics for varying the amount of time to print the code on the product. For instance, the printing system includes electronics for changing the density of pixels that define the code. Codes having a reduced pixel density can be printed more quickly than codes with an increased pixel density. Further, the printing system includes electronics for changing the size of the pixels that define the code. Smaller pixels need less printing time. In addition, the dwell time of the printing system can be changed as noted above. The ability to change the time needed to print a code allows the printing system to be used in conjunction with more production lines.

FIGS. 1A and 1B illustrate a printing system 10 for printing on a product 22 positioned adjacent to the printing system 10. FIG. 1A is a side view of the printing system 10, while FIG. 1B is a cross sectional top view of the printing system 10. The printing system 10 includes a laser 12 for producing a printing beam 14. Any laser 12 can be used in the printing system. Since the dwell time can be increased in order to compensate for the reduced laser power, a low powered laser can be employed in the printing system. For instance, the laser 12 can be a $CO_2$ air-cooled laser. In some instances, the laser may be a 25-Watt laser, a 20-Watt laser, a 15-Watt laser or a 13-Watt laser.

The printing beam 14 from the laser/energy source 12 passes through an optics assembly 18 and is incident on a material 20, such as the material used in product packaging. As will be described in more detail below, the time that the beam 14 is incident on the material 20 can be adjusted such that the beam 14 causes a spot to be formed on the material 20.

The optics assembly 18 includes components for altering the direction of the printing beam 14. These components can be controlled to steer the printing beam 14 from one location to another location so as to create a spot at each of the locations. As will be described in more detail below, the spots can be arranged to form one or more pixels 88 on the material 20. In addition, these pixels 88 can be arranged to form one or more symbols on the material 20. These symbols can be an alphanumeric code printed on a product 22 or on the label of a product 22.

The printing system 10 also includes electronics 26 in communication with the laser/energy source 12 and the optics assembly 18. The electronics 26 can include one or more processors for providing the functionality to the printing system 10. Suitable processors include, but are not limited to, microprocessors, digital signal processors (DSP), integrated circuits, application specific integrated circuits (ASICs), logic gate arrays and switching arrays. The electronics 26 can also include one or more memories for storing instructions to be carried out by the one or more processors and/or for storing data developed during operation of the printing system 10. Suitable memories include, but are not limited to, RAM and electronic read-only memories (e.g., ROM, EPROM, or EEPROM).

The electronics 26 control the operation of the laser 12 and the optics assembly 18. For instance, the electronics 26 can control the optics assembly 18 to adjust the direction of the printing beam 14, the length of time that the printing beam 14 dwells at a location on the material 20 where a spot is to be formed, the speed that the printing beam 14 moves between each location where the beam dwells, the size of pixels 88 used to create visually recognizable symbols, the selection of symbols created, etc.

The electronics 26 can optionally be in communication with a user interface 30. The user interface 30 can be remote from the housing 16, attached to the housing 16 and/or detachable from the housing 16. The user interface 30 may be a handheld device. A suitable user interface 30 can include an alphanumeric keyboard and a display. The user interface 30 can be used to program the electronics 26 and/or set printing parameters. For instance, the user interface 30 can be used to manually control the time that the printing beam 14 dwells at a single location on the material 20, the size of the pixels 88 used to form a visually observable symbol, the type and/sequence of symbol which are formed, etc. The user interface 30 can also be used to manually activate the printing system 10. For instance, the user interface 30 can include a print key which causes the printing system 10 to print on the material 20.

The electronics 26 can also be in communication with one or more sensors 31. These sensors 31 can provide the electronics 26 with information about the products on which the printing system 10 is to print. For instance, the sensors 31 can indicate the location of a product 22 relative to the printing system 10, the direction that a product 22 is moving, when a moving product 22 has been stopped, and when a product 22 is in the correct position to be printed upon. Suitable sensors 31 (described below) may include, but are not limited to, a speed sensor for detecting the speed and/or direction that a product 22 is moving and a location sensor for indicating when a product 22 is positioned in front of the sensor 31.

The printing system 10 includes a printing beam exit member 32 through which the printing beam 14 exits the housing 16. The printing beam exit member 32 can be as simple as an opening in the housing 16 or an immobile window mounted in the housing 16. In another embodiment, the printing beam exit member 32 can be moved relative to the housing 16 as illustrated by the arrow labeled A. In this embodiment, the printing beam 14 can be manually aimed toward a particular position on the material 20 by manipulating the printing beam exit member 32.

Because the laser can be a low power laser, the housing 16 can also be compact. For instance, the housing 16 can have a volume of less than 1200 cubic inches. In some instances, the housing 16 has a volume less than 900 cubic inches In other instances, the housing 16 has a volume less than 1200 inches. In one embodiment, the housing 16 has a length, L, less than 25 inches, a width, W, less than 10 inches and a height, H, less than 5 inches. In another embodiment, the housing 16 has a length, L, less than 23.5 inches, a width, W, less than 7.5 inches and a height, H, less than 4 inches.

For purposes of these dimensions, the housing 16 may include the print beam exit member 32.

The small size is also associated with a low weight. For instances, in one embodiment, the housing 16 and the enclosed components weighs less than 30 pounds. In some instances, the housing 16 and the enclosed components weigh less than 25 pounds and in other instances, the housing 16 and the enclosed components weigh less than 22 pounds. This weight does not include the weight of components which are remote from the housing 16. For instance, this weight does not include user interfaces 30 which are not integral to the housing 16. In addition, this weight does not include the weight of any sensors with which the printing system 10 is in communication but which are not integral with the housing 16.

Figure 2:
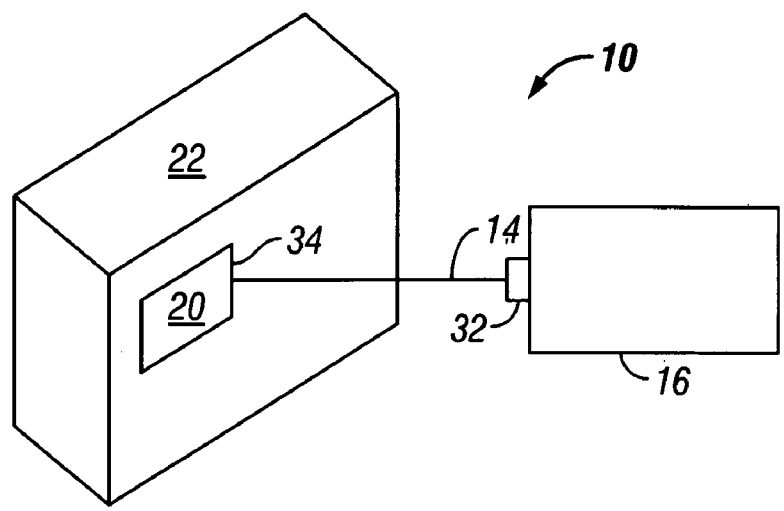
FIG. 2 illustrates the printing system of FIG. 1A forming a print zone upon a product.

FIG. 2 illustrates an example of the printing system 10 forming a print zone 34 upon a product 22. The printing system 10 can include components for defining the print zone 34 on the material 20. For instance, the printing system 10 can project a rectangle onto the material 20 as illustrated in FIG. 2. The printing system 10 forms the symbol of the code within the print zone 34.

During operation of the printing system 10, the print zone 34 may be printed automatically or be controlled by an operator. The operator may adjust the beam outlet member 32 so that the print zone 34 is formed at a desired location on the material 20. The user interface 30 is then used to activate print within the print zone 34. As a result, the operator of the printing system 10 can select where the printing system 10 prints a code on the material 20 by ensuring that the print zone 34 appears in the desired print location. Suitable print zone marks may include, but are not limited to, marks at the four corners of a print zone 34, a mark positioned in the center of the print zone 34, and a dashed line around the print zone 34.

In one embodiment of the printing system 10, the electronics 26 control the size and geometry of the print zone 34. As a result, the electronics 26 can match the size and shape of the symbols to be printed on the material 20. For example, when an unusually large code is to be printed on the material 20, the electronics 26 can enlarge the print zone 34 so the code will be formed entirely within the print zone 34. As a result, an increase in the size of the code will not result in erroneous positioning of the code on the material 20.

Figure 3A:
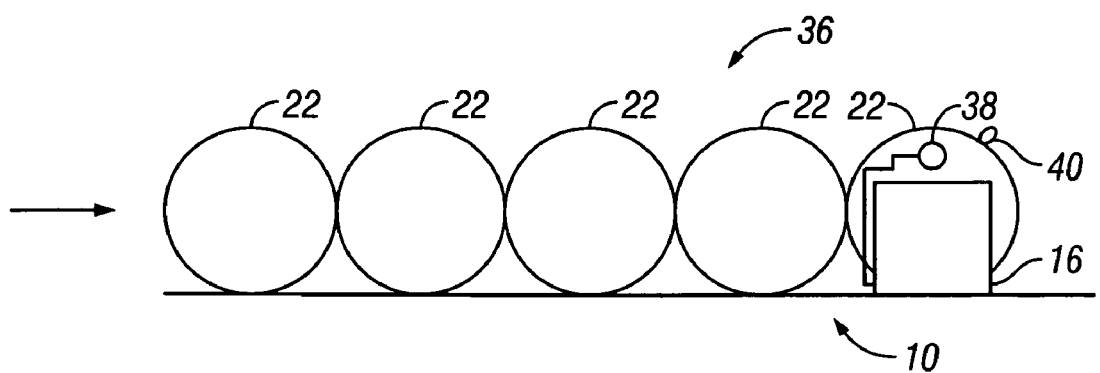
FIG. 3A is a side view of a printing system used in conjunction with a product line which temporarily stops a product in front of the printing system.

FIG. 3A illustrates a side view of the printing system 10 in operation with a product line 36 which temporarily stops the product 22 in front of the printing system 10. The printing system 10 can print on a stationary product 22 or on packaging located on a product line 36 which moves the product 22 relative to the printing system 10. The printing system 10 in FIG. 3A is in communication with a print trigger 38 which detects when one of the products 22 is positioned in front of the print trigger 38. A suitable print trigger 38 includes a device which produces a light beam. The device can be set up next to the product line 36 so that the product 22 disrupts the beam as the product 22 travels along the product line 36. The printing system 10 can monitor the device to determine when a product 22 has disrupted the beam. The print trigger 38 can be positioned such that when it has been triggered, the product 22 is correctly positioned for printing on the product 22. Alternatively, the print trigger 38 can be positioned such that when it has been triggered, a time delay will pass before the product 22 is correctly positioned for printing upon the product 22.

The printing system 10 is also in communication with a stop mechanism 40 which stops each product 22 in front of the printing system 10. During operation of the product line 36, the stop mechanism 40 is withdrawn to allow the products 22 to move along the product line 36. The movement can result from one or more mechanical forces or one or more natural forces such as gravity. Once the product 22 has moved past the stop mechanism 40, the stop mechanism 40 is moved back into place to block the next product 22.

During operation of the printing system 10 illustrated in FIG. 3A, the products 22 pass before the printing system 10 on the product line 36. The printing system 10 monitors the print trigger 38 to determine when a product 22 has moved in front of the print trigger 38. The printing system 10 waits a pre-set delay to let the product 22 be pressed against the stop mechanism 40 and then prints the symbols on the packaging. As a result, the product 22 remains stationary while the printing system 10 prints the code on the packaging.

Once the code has been printed, the printing system 10 activates the stop mechanism 40 so the product 22 is again able to move. The printing mechanism monitors the print trigger 38 to find a gap between products 22. Once a gap is found, the printing system 10 activates the stop mechanism 40 to stop the next product 22 and again monitors the print trigger 38 to detect when the next product 22 has moved in front of the print trigger 38.

FIGS. 3B and 3C illustrate the printing system 10 in use with a product line 36 which continuously moves the product 22 past the printing system 10. The products 22 can be evenly or sporadically spaced on the line. The printing system 10 is in communication with a print trigger 38 and a speed sensor 42. The electronics 26 (FIG. 1B) can use signals from the speed sensor 42 to determine the speed and direction of the products 22 on the product line 36. Suitable speed sensors include, but are not limited to, encoders and resolvers.

While setting up the printing system 10, the distance between the printing system 10 and the print trigger 38 is administratively entered into the electronics 26. In an alternative embodiment, the print trigger 38 is attached to the housing 16 so as to provide a fixed and known distance between the print trigger 38 and the printing beam 14. In this embodiment, the distance is known to the electronics 26 and does not need to be administratively entered.

During operation, the printing system 10 monitors the print trigger 38 to determine when a product 22 has moved in front of the print trigger 38. When it determines that a product 22 has moved in front of the print trigger 38, the printing system 10 determines the speed of the product 22 on the line 36 and uses this speed to determine a code position time delay. The code position time delay is determined such that the code is printed at a desired position on the product 22. A suitable method for determining this code position time delay is discussed below. Once the determined code position time delay has passed, the symbols are printed as the product 22 moves past the printing system 10.

Once the code is printed, the print trigger 38 may determine when the product 22 has moved past the print trigger 38. In one embodiment, the print trigger 38 is always monitoring to identify when a new product 22 has moved in front of the print trigger 38. As shown in FIG. 3B, the print trigger 38 can be triggered by one product 22 while the printing system 10 is printing on another product 22. Hence, the printing system 10 may track the time delay for one of the products 22 while printing on another product 22. These situations can be handled with standard multi-task programming.

The printing system 10 can be used with other product lines 36. For instance, some product lines 36 include a labeling station for applying a label to a product 22. A labeling station typically includes electronics for determining when each product 22 has the label applied. The printing system 10 can be in communication with the labeling station and can print the code on each label after it has been applied to the product 22. The printing of the code can be triggered by the electronics within the label station. For instance, when the electronics of the label station detect that a label has been applied, these electronics can provide the printing system 10 with a signal indicating that the code should be printed.

Figure 4A:
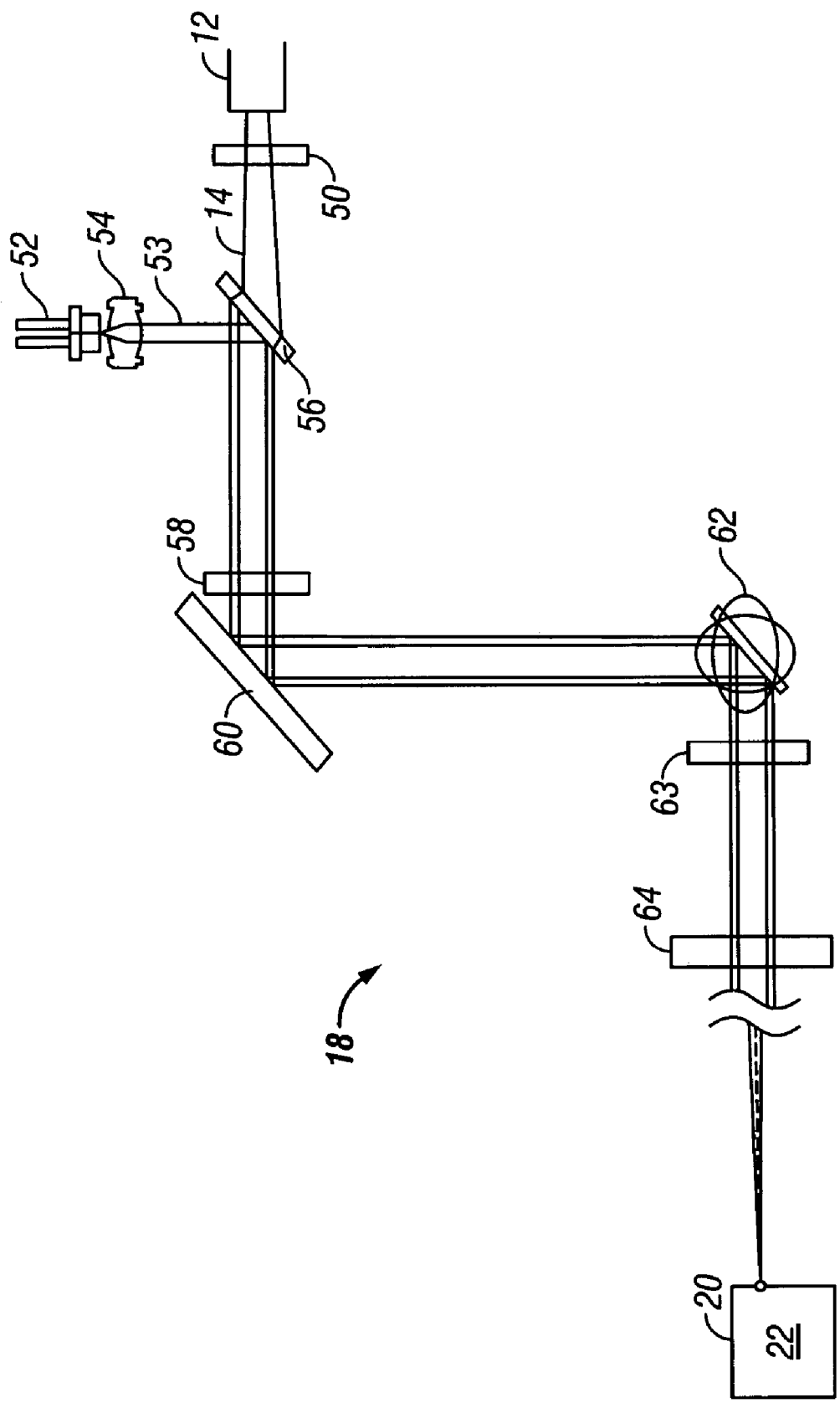
FIG. 4A illustrates an optical assembly for use in the printing system of FIG. 1A.

FIG. 4A illustrates a top view of an optics assembly 18 in the printing system 10. The optics assembly 18 includes the laser source 12 for producing the printing beam 14. The printing beam 14 passes through a first negative lens 50, which expands the printing beam 14. The optics assembly 18 also includes a print zone light source 52 for producing a print zone beam 53, which passes through a second negative lens 54, which expands the print zone beam 53. Although the printing beam 14 and the print zone beam 53 are illustrated as being concurrently produced, the electronics 26 (FIG. 1B) can cause them to be produced independent of one another. Further, the print zone beam 53 is optional and need not be included in the optics assembly 18.

The printing beam 14 and the print zone beam 53 are combined at a beam combiner 56. The combined beams pass through a positive lens 58, which collimates the beams before they are turned at a reflector 60. The combined beams then pass to a plurality of mirrors 62 which reflect the combined beams toward a second positive lens 63, which focuses the combined beams. The combined beams then pass through a protective window 64 before passing to the product 22.

Figure 4B:
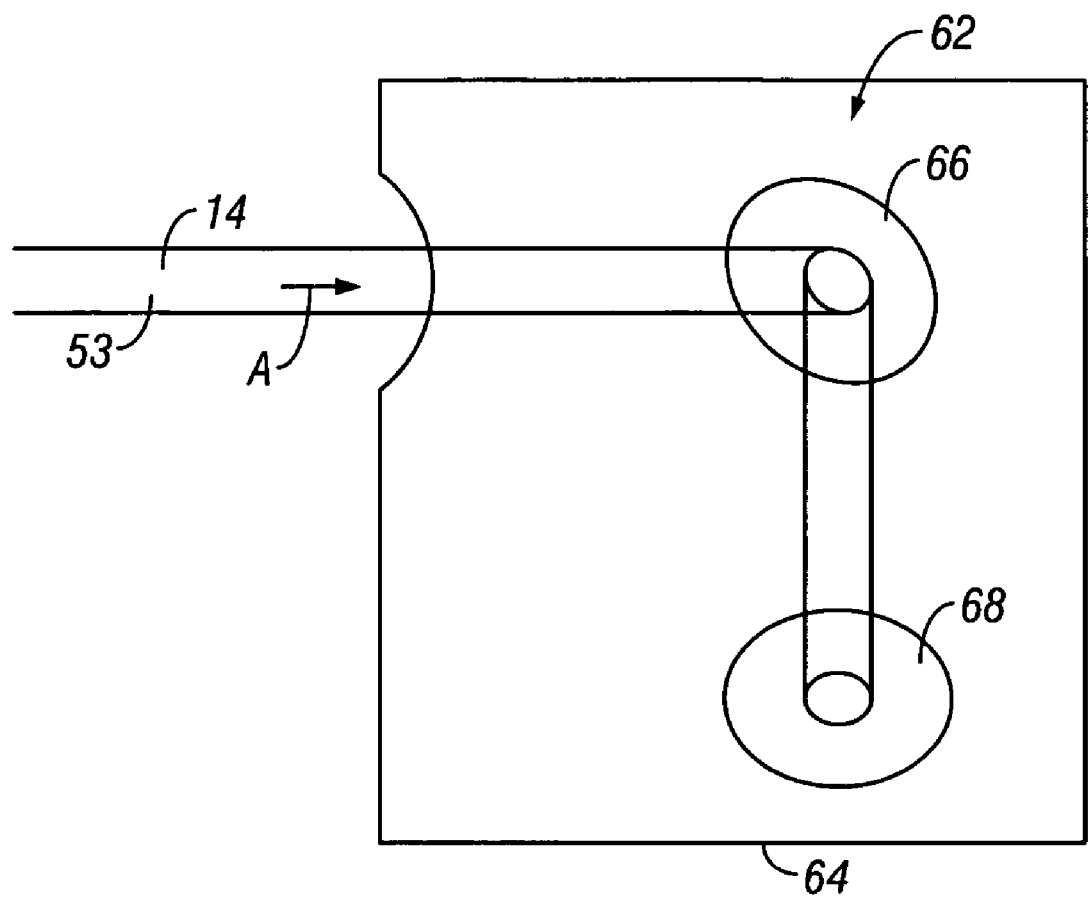
FIG. 4B is a side view of a plurality of mirrors of FIG. 4A configured to steer a printing beam produced by the printing system from one location to another on a product where a code is to be formed.

Because FIG. 4A is a top view of the optics assembly 18, and the mirrors 62 are positioned on top of one another, the arrangement of the mirrors 62 is not apparent from FIG. 4A. In order to clarify the arrangement of the mirrors, FIG. 4B provides a side view of the optics assembly 18 looking through the protective window 64. The combined beams 14, 53 approach the mirrors 62 from the left as illustrated by the arrow labeled A. The beams 14, 53 are reflected off a first mirror 66 down toward second mirror 68. The combined beams 14, 53 are reflected from the second mirror 68 out of the page.

Figure 4C:
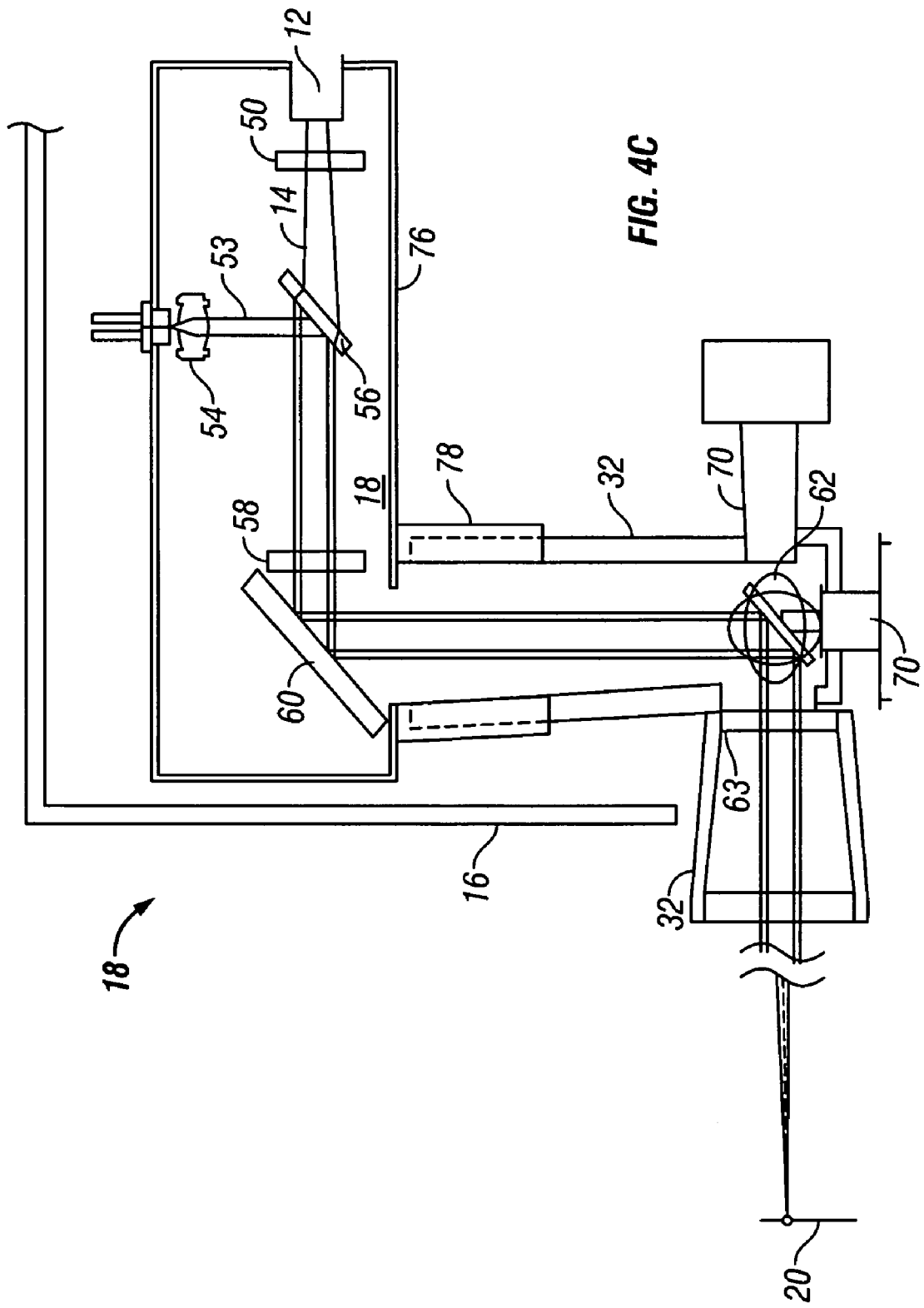
FIG. 4C illustrates the relationship between an optics assembly and a housing of the printing system of FIG. 4A.

As illustrated in FIG. 4C, one or both of the mirrors 62 can be coupled with a one or more actuators 70 for moving the mirrors 62. Suitable actuators 70 include, but are not limited to, micromotors. The actuators 70 are controlled by the electronics 26 (FIG. 1B) to steer the beams 14, 53 to form symbols and the print zone 34 on the packaging. For instance, when the print zone 34 has a rectangular shape, the print zone beam 53 can trace a rectangle around the print zone 34 at a speed which causes the rectangle to appear solid to the human eye or at about 100 cycles/second.

Figure 4D:
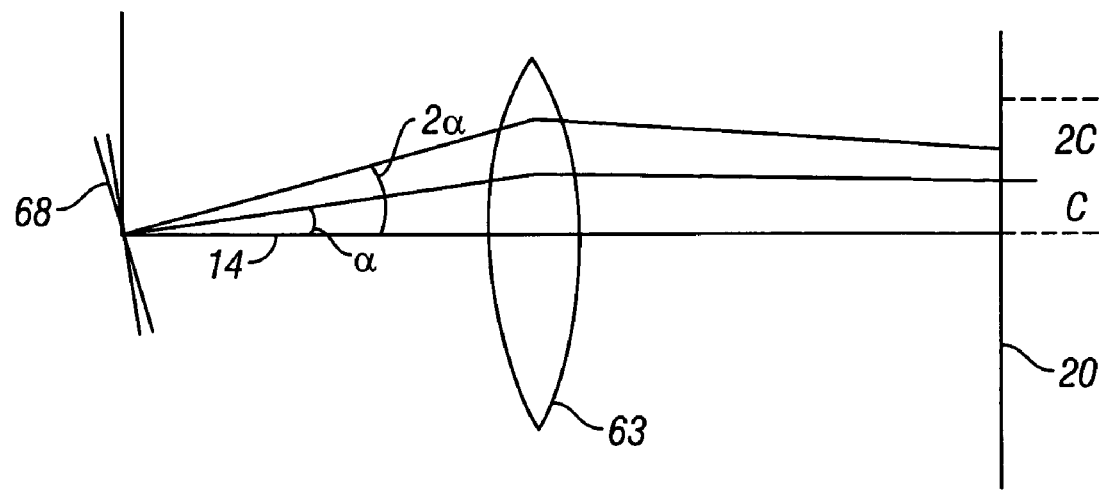
FIG. 4D illustrates the non-linear nature of a lens used in the optics assembly of FIG. 4A.

The second positive lens 63 of FIG. 4A can be a non-linear lens. FIG. 4D illustrates the second mirror 68 in a first position and a second position. In the first position, the angle between the printing beam 14 and a lens axis is $\alpha$, while in the second position this angle is doubled to $2\alpha$. Due to the non-linear nature of the lens 63, the printing beam 14 is incident on the product 22 at a distance, C, from the lens axis when the second mirror 68 is in the first position. However, when the second mirror 68 is in the second position, the printing beam 14 is not incident on the product 22 at a distance, 2C, from the lens axis despite the angle being increased to $2\alpha$. The lack of proportionality between the movement of the mirror 68 and the movement of the printing beam 14 results from the non-linear nature of the lens 63.

The electronics 26 (FIG. 1B) can include logic which corrects for the effects of non-linearity of the second positive lens 63. Accordingly, this logic would cause the second mirror 68 to increase the angle by more than $2\alpha$ in order to move the printing beam 14 by 2C. The correction logic can be developed from theoretical optical equations providing a relationship between $\alpha$ and C for the second positive lens 63. Alternatively, the correction logic can be developed from experiments performed to determine the relationship between a and C. This correction logic eliminates the need for an expensive and large F-$\theta$ lens which is typically used to correct for non-linearity. Accordingly, this correction allows the size and cost of the printing system 10 to be reduced.

The effects of spherical aberration can be corrected with the variable dwell time. For instance, the dwell time may be increased when the effects of aberration are apparent on the product 22.

During operation of an optics assembly 18 including a printing zone light source 52, the print zone light source 52 is activated and the laser 12 is deactivated. The mirrors 62 are moved such that the print zone 34 is formed on the product 22. When the symbols are to be formed on the packaging, the print zone light source 52 is disengaged, and the laser/energy source 12 engaged until the symbols are formed. Once the symbols are formed, the laser/energy source 12 can be disengaged and the print zone light source 52 engaged in order to continue with formation of the print zone 34.

Figure 4E:
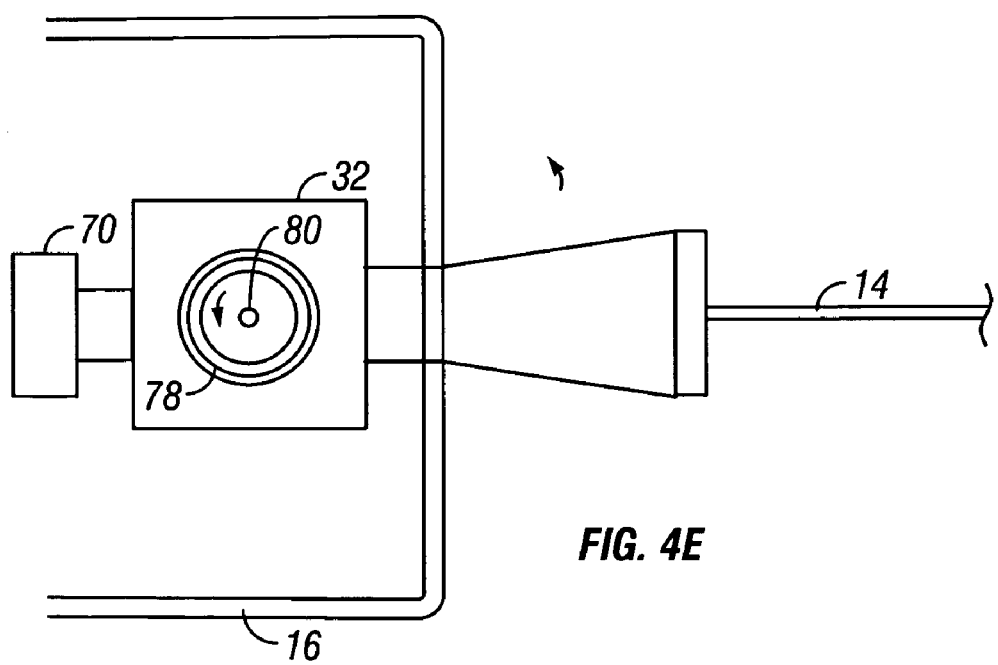
FIG. 4E illustrates a bearing of FIG. 4B which allows a printing beam exit member of the printing system to be rotated relative to a housing of the printing system.

As discussed above with reference to FIG. 11B, the printing system 10 can include a printing beam exit member 32 which can be moved relative to the apparatus housing 16. FIGS. 4C and 4E illustrate the mechanical arrangement which permits this movement of the printing beam exit member 32. A frame 76 in FIG. 4C supports the printing beam exit member 32 within the housing 16. A bearing 78 positioned between the frame 76 and the printing beam exit member 32 allows the printing beam exit member 32 to move relative to the frame 76. FIG. 4E provides a cross-sectional side view of the bearing 78 looking along the printing beam 14. The printing beam 14 passes through the bearing 78 (FIGS. 4C and 4E) along the axis of rotation 80 permitted by the bearing 78 (FIG. 4E), is reflected by the mirrors 62 (FIG. 4C) and passes through the end of the exit member 32 (FIGS. 4C and 4E). Hence, movement of the printing beam exit member 32 relative to the frame 76 does not change the position of the printing beam 14 relative to the bearing 78.

As illustrated in FIGS. 4C and 4E, the mirrors 62 and the actuators 70 are coupled with the printing beam exit member 32. As a result, the mirrors 62 and the actuators 70 move with the printing beam exit member 32 as the printing beam exit member 32 is moved relative to the housing 16. Further, a portion of the first mirror 66 (FIG. 4B) is positioned along the bearing's axis of rotation 80 (FIG. 4E). Hence, movement of the printing beam exit member 32 does not alter the angle of incidence between the printing beam 14 and the first mirror 66. Accordingly, when the printing beam exit member 32 is moved relative to the housing 16, the first mirror 66 still directs the printing beam 14 toward the same portion of the second mirror 68, and the printing beam 14 still exits the housing 16 through the same portion of the protective window 64. The rotatability of the printing beam exit member 32 relative to the housing 16 allows the printing beam 14 transmitted through the printing beam exit member 32 to be aimed at various positions on the product 22.

As described above, the printing beam 14 forms a plurality of spots at a variety of locations on the product 22 by remaining at the location until an optical characteristic of the location is altered. For illustrative purposes, FIGS. 5A–5D illustrate formation of a spot on a product 22 by removing a layer of ink from the product 22. FIGS. 5A and 5B illustrate the printing beam 14 incident on the material 20 at a particular location before a spot 83 (FIG. 5C) is formed on the material 20. The material 20 includes a substrate 82 such as paper. An ink layer 84 is formed on the substrate 82. The ink layer 84 can include several different ink types as well as several different colors as is apparent from the labels of many commercially available products 22. The material 20 illustrated in FIG. 5A includes an additional layer 86. The additional layer 86 represents the one or more layers which are often present over the ink layer 84 on product packaging. For instance, many materials 20, such as dog food bags, include a wax layer over the substrate 82 and ink layers 84.

FIGS. 5C–5D illustrate the material 20 after the spot 83 has been formed at the particular location on the material 20. The time that the printing beam 14 dwells at the particular location is adjusted such that the printing beam 14 has ablated the ink layer 84 and the additional layer 86 from the material 20 without burning the substrate 82. As a result, the substrate 82 is seen at the particular location on the material 20. The time to ablate an ink layer 84 is typically 100–500 µs.

The time to form the spot 83 is often a function of the materials 20 in the layers. For instance, the additional layer 86 can be a wax layer which protects the packaging and gives it an attractive appearance. Forming a spot 83 through such layers often requires more time than is required by the ink layer 84 alone.

The present application includes adjusting the time that the printing beam 14 dwells at a location such that a spot is formed at the location. In some instances, the dwell time is greater than 50 µs, such as 100 λs, 200 µs, 50–50,000 µs, 100–500 µs or 200–500 µs. In some instances, the diameter of the spot is less than 400 µm, less than 250 µm or less than 170 µm.

Figure 6A:
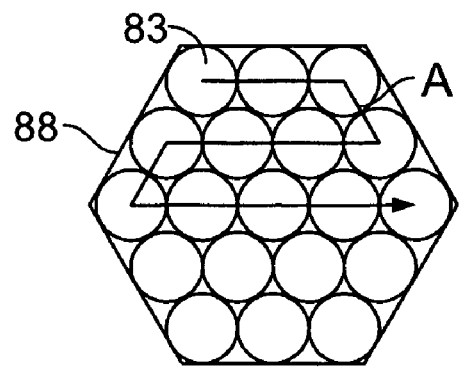
FIGS. 6A–6D illustrate formation of pixels having different sizes.

FIG. 6A illustrates a plurality of spots 83 arranged on the material 20 (FIG. 5A) so as to define a pixel 88 on the material 20. Moving the printing beam 14 from one location to another location as illustrated by the arrow labeled A creates the pixel 88. A spot 83 is created at each location. The printing beam 14 is preferably incident on the material 20 throughout the formation of the pixel 88. The printing beam 14 is preferably moved from between locations where spots 83 are to be formed at a speed which prevents ablation of any of the layers on the material 20 between spots 83. This is possible due to the relatively low power of the laser 12. As a result, marks are not formed on the material 20 between the spots 83. Alternatively, the printing beam 14 can be moved from one location to another slow enough to provide some ablation between the spots 83. The additional ablation can help create the appearance of continuity between the spots 83.

Figure 6B:
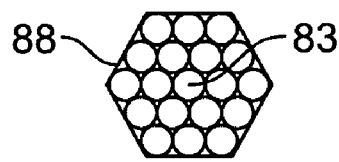
Figure 6C:
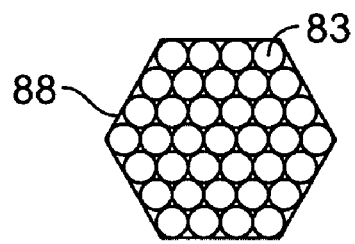
Figure 6D:
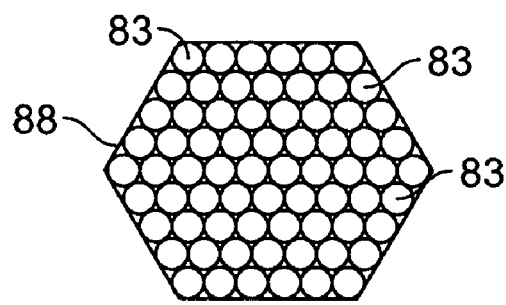

The size of the pixels 88 formed by the printing system 10 can be selected as illustrated in FIG. 6B–6D. Increasing the number of spots 83 used to create the pixel 88 can increase the size of a pixel 88. For a given energy source power and spot size, there is a tradeoff between the time needed to create a pixel 88 and the pixel size. Hence, when an increased printing time is needed, the pixel size can be reduced. Further, the pixels 88 illustrated above have a hexagonal shape, the spots 83 can be arranged in a pixel 88 having a shape other than hexagonal. For instance, the pixels 88 can be square, triangular, circular, etc. In one embodiment, the operator of the printing system 10 can use the user interface 30 (FIG. 1A) to select the size and shape of the pixel 88.

Figure 7A:
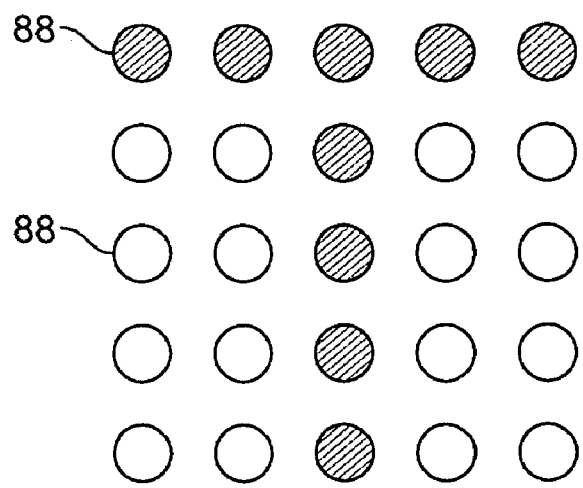
FIG. 7A illustrates an array of possible pixels which are selected to form a symbol within the array.
Figure 7B:
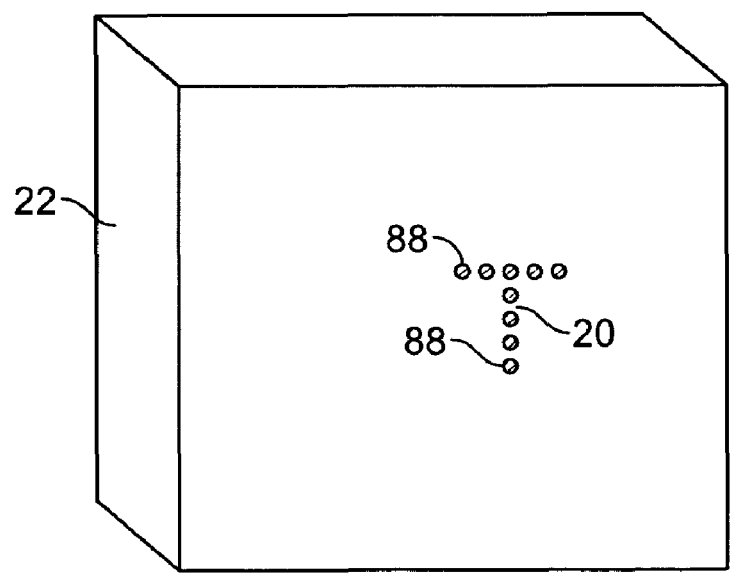
FIG. 7B illustrates the symbol of FIG. 7A printed on a product.

FIG. 7A illustrates an array of possible pixels 88 arranged in 5 columns and 5 rows. Symbols can be formed in the array by selecting certain of the possible pixels 88 to become a pixel 88 of a symbol while not selecting other of the pixels 88. For instance, a "T" is formed by selecting the possible pixels 88 which are darkened in FIG. 7A. The printing system 10 (FIG. 1A) creates the symbol on the product 22 by directing the printing beam 14 so as to create pixels 88 on the product 22 in the pattern selected from among the possible pixels 88 in the array. Accordingly, the symbol appears on the product 22 as illustrated in FIG. 7B. The creation of symbols from a limited number of possible pixels 88 is well known as is illustrated by generation of characters on the LCD display of a calculator or traditional scoreboards.

Although the array of FIG. 7A is illustrated as having circular pixels 88, the array can include pixels 88 of different shapes such as squares. The distance between the pixels 88 can also be adjusted to increase or decrease the size of the code. In some instances, the distance between the pixels 88 is reduced to the point that the perimeter of one pixel 88 abuts the perimeter of another pixel 88. When the pixel 88 perimeters abut one another and the pixels 88 have a square shape, the symbols of the code can have a solid and continuous appearance.

Although the illustrated array is a 5×5 array, other array dimensions are possible. For instance, 5×5, 7×5 and 16×10 are preferred array dimensions. Further, the array need not be arranged in rows and columns. In addition, the possible pixels 88 in an array can overlap. Further, some pixels 88 can have a different size than other pixels 88. In addition, the array size can be changed to meet printing time requirements. For instance, when a code to be printed is so large that the system 10 (FIG. 1A) is not able to print the code on a moving product 22 within the time that the product 22 occupies a position in which the code can be printed, the array size may be reduced in order to reduce the number of pixels that are printed by the system 10. Because the system 10 has to print fewer pixels, the time needed to print the code is reduced. Accordingly, an embodiment of the application includes electronics for changing the pixel density in an alphanumeric code to be printed on a moving product.

The electronics 26 of FIG. 1B can include a database which associates each symbol with a particular pixel pattern. As a result, the operator can enter a symbol or symbol sequence into the user interface 30 and the printing system 10 consults the database to determine the pixel pattern associated with each symbol. The electronics 26 can use the pixel pattern of each symbol to form a first data set which indicates the position of each pixel 88 in a code. For instance, each pixel 88 can be associated with a Cartesian coordinate which indicates where the pixels 88 are to be printed relative to one another. Other coordinate systems and methods can also be used to control the relative positioning of the pixels 88 in a symbol.

Because the laser 12 used is preferably a low power laser, the laser 12 can be moved between pixels 88 without making any marks on the material 20 between the pixels 88. Hence, the laser 12 can also be moved between the symbols without marking portions of material 20 between the symbols. As a result, there is no need to disrupt the printing beam 14 while moving the printing beam 14 between pixels 88 and/or symbols. Typical methods for disrupting the printing beam 14 include turning off the laser 12 or positioning an opaque object in the printing beam 14. The disrupting methods may require synchronizing the printing beam disruption with both the motion of the printing beam 14 and any motion of the product 22. A printing system 10 according to the present application may overcome these difficulties.

Figure 8A:
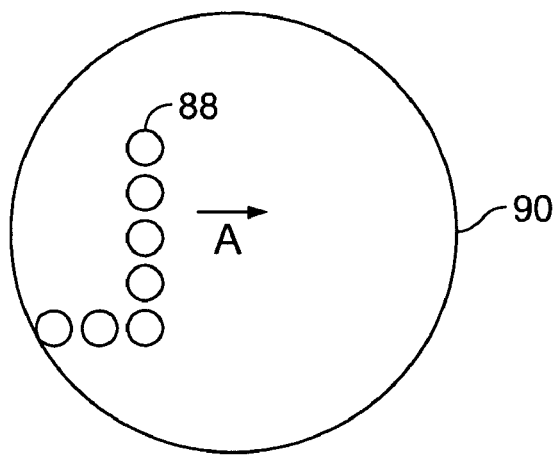
FIG. 8A illustrates an aperture which limits the area within which the printing system is able to print.

FIG. 8A illustrates an aperture 90 which is the area within which the laser 12 can effectively print. Although this aperture 90 can be a physical window, this aperture 90 is typically a result of the limitations of the optics assembly 18 (FIG. 4A). For instance, the aperture 90 typically defines the area within which the optics assembly 18 will allow the printing system 10 to print without an undesirable loss of print quality. As the product 22 moves past the printing system 10, the printing system 10 prints the code through this aperture 90. In order to increase printing efficiency when printing on a moving product 22, the printing system 10 can employ a pixel prioritization method. The pixel prioritization method increases the effective size of this aperture 90. Hence, the pixel prioritization method allows the product 22 to be moved past the printing system 10 faster than what could be achieved without the pixel prioritization method.

Figure 8B:
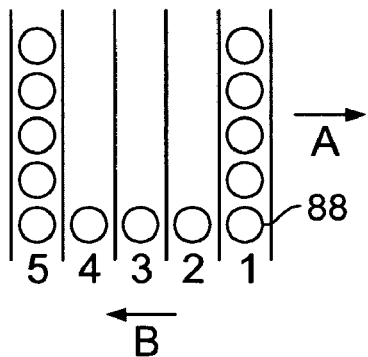
FIG. 8B illustrates a symbol to be printed on a product continuously moving in front of the printing system.

Pixel prioritization determines the order that the pixels 88 will be formed on the product 22. The pixels 88 having higher priorities are printed before pixels 88 having lower priorities. The pixels 88 are prioritized such that the sequence/order that they are printed causes them to be printed in a direction opposite of the product's direction of motion. For instance, FIG. 8B illustrates a U shaped symbol formed in an array of pixels 88 having 5 columns and 5 rows. The order that the columns are printed is prioritized in a direction opposite of the direction which the product moves. The U shaped symbol is to be printed on a product 22 moving in the direction of the arrow labeled A. The order of pixel formation is prioritized in the direction illustrated by the arrow labeled B. Specifically, the pixels 88 in the column labeled 1 are printed first while the pixels 88 in the column labeled 5 are printed last.

FIG. 8A illustrates a portion of the U shaped symbol of FIG. 8B as it is being printed. Since the pixels 88 are printed in a direction which is opposite to the direction of motion, the portion of the product 22 where the remainder of the symbol is to be printed has not yet entered the aperture 90 in FIG. 8A. As a result, there is still time available for printing the pixels 88 remaining in the symbol. However, if the pixels 88 were prioritized in the opposite direction, the portion of the product 22, the pixels 88 to be printed last might pass out of the aperture 90 before the printing system 10 has the opportunity to print them. Hence, the product 22 would need to be moved more slowly in order to be able to print the symbols. As a result, prioritizing the pixel 88 formation in a direction opposite to the product's direction of motion allows the product 22 to be moved past the printing system 10 at an increased rate of speed.

Figure 8C:
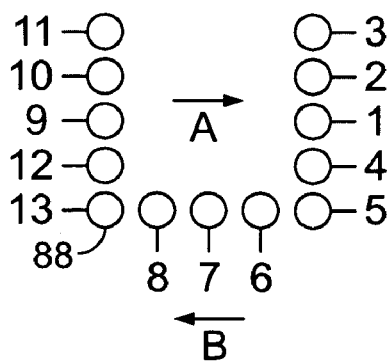
FIG. 8C illustrates a symbol to be printed on a product continuously moving in front of the printing system.

FIG. 8B illustrates the pixels 88 being prioritized by column in that there is no particular print priority assigned to the pixels 88 within a column. However, the order of the pixels 88 can be individually prioritized, as shown in FIG. 8C. In some instance, the pixels 88 in one or more columns are prioritized such that the pixels 88 which would enter the aperture 90 first if they were already present on product 22 are given the highest priority. For instance, if the U shaped symbol of FIG. 8C is on a product 22 traveling in the direction illustrated by the arrow labeled A, the pixel 88 labeled 1 will be the first pixel 88 to enter the aperture 90. Accordingly, this pixel 88 is provided the highest print priority in column 1.

Although the above discussion relates primarily to the prioritization of pixels 88, the prioritization can be at the level of the spots 83 which form the pixels 88. For instance, the spots 83 can be given a priority so they are printed in a direction opposite to the product's direction of motion. In addition, the spots 83 can be prioritized based upon the order that the spots 83 would enter the aperture if the spots 83 were already printed on the product 22.

FIGS. 9A–9D illustrates the formation and use of a corrected data set, i.e., a corrected code. In order to print on a moving product 22, the printing system 10 converts a first data set (FIG. 9A) to a corrected data set (FIG. 9B). The printing system 10 then prints the corrected data set and treats the product 22 as if it were stationary relative to the printing system 10. The corrected data set is an image of the original data set which illustrates where the pixels of the code/data set should be printed on a moving product 22. The corrected data set is generated using the product's speed and direction provided by a speed sensor 42 (FIGS. 3B–3C) and the average time required to form a pixel 88. The corrected data set is also generated using a pixel printing order. The pixel 88 printing order can be generated according to the pixel priority scheme discussed above or according to any other pixel printing order scheme. The position of each pixel 88 in the corrected data set, $P_n$, is determined by presuming that the pixel 88 in the original symbol moves with the velocity of the product 22 until the pixel 88 is formed as indicated by the vectors illustrated in FIG. 9B.

The position of each pixel 88 in the corrected data set, $P_n$, can be expressed in a number of coordinate systems including Cartesian coordinates. $P_n$ can be determined according to equation 1 where n is the $$P_n = P_{n,o} + (n-1)(t)v \tag{1}$$

priority assigned to a pixel 88, $P_{n,o}$ is the original position of pixel 88 n, t is the approximate time required to form a pixel 88 and v is the velocity vector constructed from the speed and direction of the product's movement.

An embodiment of the corrected data set is illustrated in FIG. 9C. It includes only the corrected pixels 88 illustrated in FIG. 9B. The printing system 10 prints the code using the pixel positions specified in the corrected data set as if the product 22 were stationary relative to the printing system 10. Hence, the printing beam 14 (FIG. 1A) is held stationary relative to the printing system 10 as each spot 83 of the pixel 88 is formed. However, the motion of the product 22 causes the code set to visually appear as the original code shown in FIG. 9D. Although the above symbol correction discussion is limited to the formation of a single symbol, each of the symbols in a code is corrected before printing.

Although the above discussion regarding corrected data sets is limited to the pixel level, in some instances the correction occurs at the spot level. More specifically, corrected positions are determined for each spot 83 making up the pixels 88 of a symbol, and the symbols are printed according to the corrected positions of the spots 83 as if the product 22 were stationary relative to the printing system 10.

FIGS. 10A–10C illustrate a method of creating and using a corrected data set at the spot level. FIGS. 10A–10C are for a code including a single pixel 88 in order to simplify the illustrative process, and the method can be easily extended to include images having multiple pixels 88. The corrected pixel/data set is an image of the pixel which illustrates where spots of a pixel should be printed on a moving product. The corrected data set is generated using the velocity of the product 22 generated using a speed sensor 42 and the average time required to form a spot 83 of the pixel 88. The corrected data set is also generated using a spot printing order. The spot printing order can be generated according to the spot priority scheme discussed with respect to the pixel 88 prioritization scheme. However, the spot 83 printing order can also be generated using other schemes. The position of a spot 83 in the corrected data set, $S_m$, is determined by presuming that the spots 83 in the pixel 88 moves at the speed and direction of the product 22 until the spot 83 is formed as indicated by the vectors illustrated in FIG. 10A.

The position of each spot 83 in the corrected data set, $S_m$, can be expressed in a number of coordinate systems including Cartesian coordinates. $S_m$ can be determined according to equation 2 where m is the $$S_m = S_{m,o} + (m-1)(t)v \quad (2)$$

print order assigned to a spot 83, $S_{m,o}$ is the original position of spot 83 m, t' is the approximate time required to form a spot 83, and v is a velocity vector constructed from the speed and direction of the product's movement.

The corrected data set is illustrated in FIG. 10B. It includes only the corrected spots 83 illustrated in FIG. 10A. The printing system 10 prints the corrected data set as if the product 22 were stationary relative to the printing system 10. Hence, the printing beam 14 (FIG. 1A) is held stationary relative to the printing system 10 as each spot 83 of the pixel 88 is formed. As a result, a spot 83 which would appear on a stationary product 22 as illustrated in FIG. 10D actually is actually "smeared" by the motion of the product 22 as illustrated in FIG. 10E. Due to the speed which the spots 83 forming the pixels 88 are generated on the product 22, the smear generally does not affect the appearance of the image. Hence, the motion of the product 22 causes the corrected data set to appear on the product 22 as the pixel 88 illustrated in FIG. 10C.

In order for the printing system 10 (FIG. 1A) to print according to the corrected data sets described above, the system 10 should be able to print a two dimensional trace of spots 83. Previous laser based systems for printing on a product have been limited to printing traces of spots or traces of pixels in a single dimension. The printing system 10 may form a two dimensional trace of spots or a two dimensional trace of pixels.

Figure 11A:
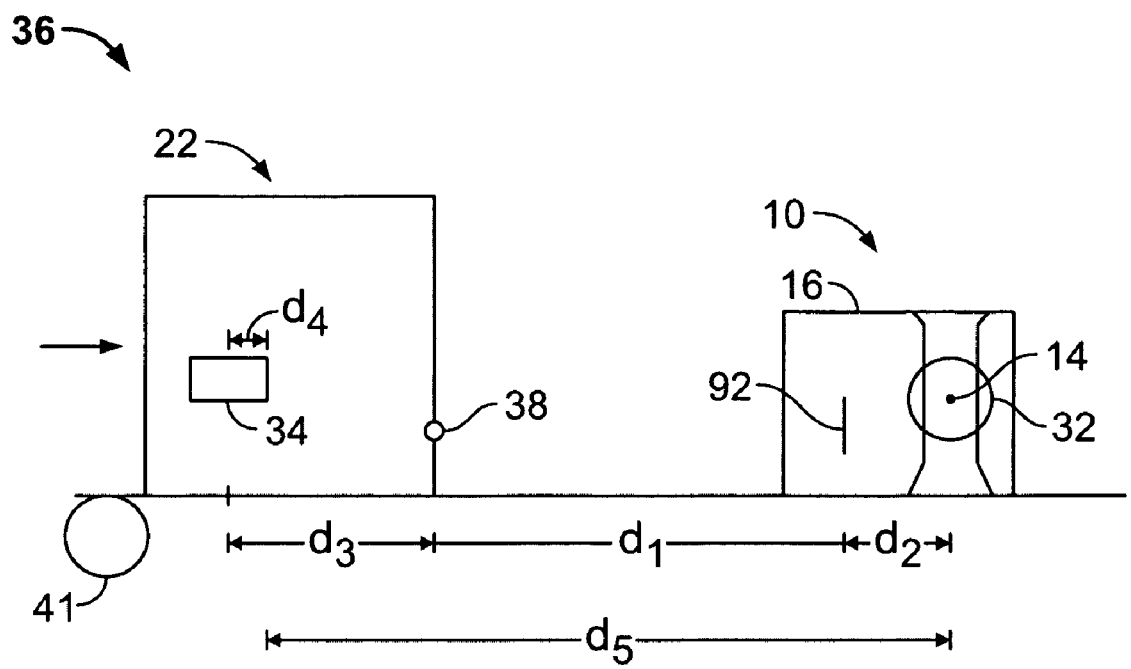
FIG. 11A illustrates a relationship between the product, the print trigger, the printing system of FIG. 1A and the print area.
Figure 11B:
FIG. 11B illustrates the leading edge of a print area.

In order for the printing system 10 to print the code at a specific position on the product 22, the printing system 10 may determine a code position delay. FIGS. 11A and 11B illustrate the relationship between the product 22, the print trigger 38 and the printing system 10. As described above, the distance between the print trigger 38 and the printing system 10 is entered during the set up of the printing system 10. This distance is illustrated as distance $d_1$ in FIG. 11A. This distance is measured relative to some constant measuring point 92 such as a mark on the housing 16. Although the measuring point 92 is illustrated as a mark on the housing 16, the measuring point 92 can also be a physical characteristic of the printing system 10. For instance, the measuring point 92 can be one side of the housing 16.

The printing system 10 knows the distance between the measuring point 92 and the edge of the aperture which is closest to the print trigger 38. This distance is illustrated as distance $d_2$ in FIG. 1A. When a product 22 trips the print trigger 38, the distance between the edge of the aperture and the leading edge of the product 22 is $d_1+d_2$.

The operator of the printing system 10 administratively uses the user interface 30 to enter into the printing system 10 the distance from the front edge of the product 22 to where he would like the center of the code to appear on the product 22. This distance is illustrated as $d_3$. The printing system 10 determines the length of the code from the pixel positions specified in the first data set and divides this length in half. This distance is illustrated as $d_4$ in FIG. 11A. The printing system 10 determines the distance between the edge of the aperture and the leading edge of the print area, $d_5$, according to Equation 3.

$$d_5 = d_1 + d_2 + d_3 - d_4 \quad (3)$$

During operation of the printing system 10, the printing system 10 divides $d_5$ by the speed of the product 22 to determine the code position time delay. When the print trigger 38 indicates that the leading edge of the product 22 has reached the print trigger 38, the printing system 10 waits for the code position time delay to pass before beginning to print the code.

Striping

Software (or firmware) in the printing system 10 (FIG. 1A) may provide striping, leading edge clipping correction, trailing edge clipping correction and update clipping correction in real-time. The software may be implemented in the electronics 26 and/or the user interface 30 of the printing system 10 in FIGS. 1A–1B. In the description below, the software is implemented in the electronics 26, which may include a processor, memory and other components.

Figure 12:
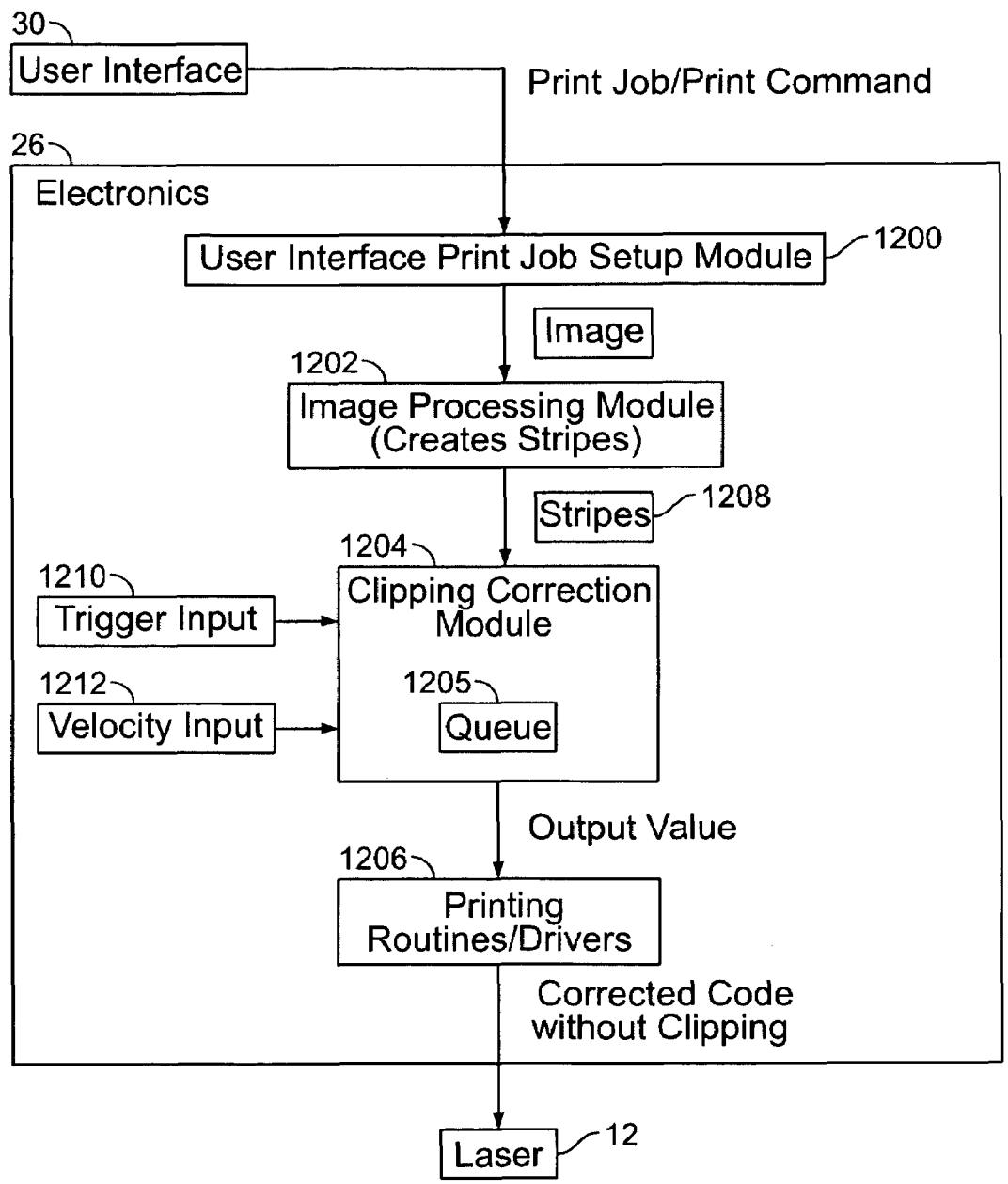
FIG. 12 illustrates a plurality of software modules in the electronics of FIG. 1B.

FIG. 12 illustrates a plurality of software modules in the electronics 26 of FIG. 1B. The software modules receive commands from the user interface 30 and control the laser 12. The software modules include a user interface print job setup module 1200 (hereinafter "print job setup module 1200"), an image processing module 1202, a clipping correction module 1204, and real-time printing routines/drivers 1206.

Figure 17:
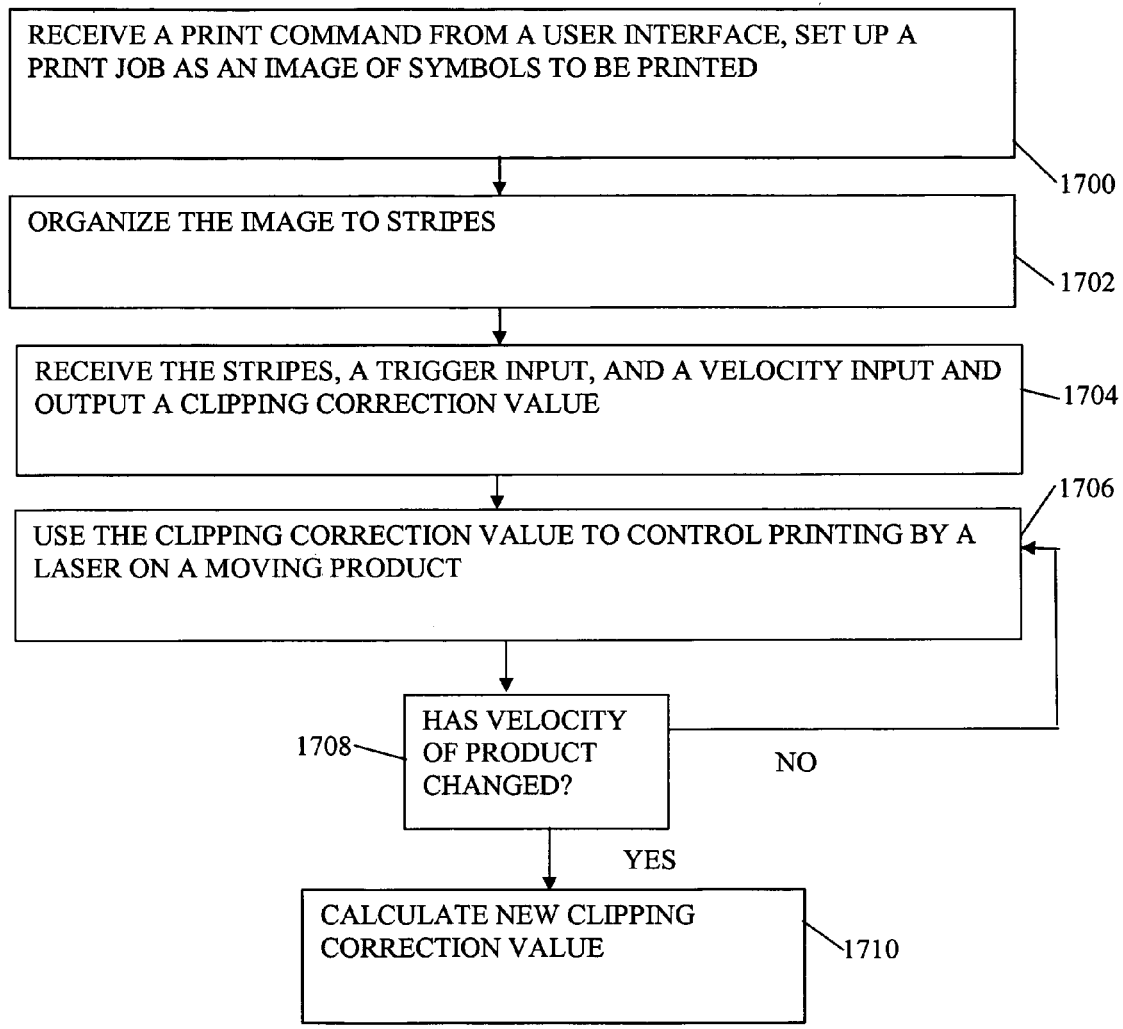
FIG. 17 illustrates a method of using the software modules of FIG. 12.

FIG. 17 illustrates a method of using the software modules in FIG. 12. In general, the print job setup module 1200 receives a print command from the user interface 30, sets up a print job as an image (e.g., list of points with an order of the points to be marked) in block 1700, and sends the image to be printed to the image processing module 1202. The image may be a code or sequence of symbols, such as one or two dimensional barcodes, corporate logos and product signs, or characters, such as Roman-language-based alphanumeric characters, Asian characters and Arabic characters.

The image processing module 1202 organizes the image to stripes (described below) in block 1702 and sends the stripes 1208 to the clipping correction module 1204. Alternatively, the image processing module 1202 sends the stripes 1208 to a first-in-first-out queue, which is accessed by the clipping correction module 1204. The clipping correction 1204 receives the stripes 1208, a trigger input 1210, and a velocity input 1212 and outputs a Clipping Correction Value (described below) to the real-time printing routines/drivers 1206 in block 1704. The real-time printing routines/drivers 1206 uses the value to control printing by the laser 12 on a moving product in block 1706.

In block 1708, the clipping correction module 1204 or the printing routines/drivers 1206 determines whether a velocity of the product has changed. If the velocity has changed, the clipping correction module 1204 determines a new Clipping Correction Value in block 1710.

In another embodiment, the images may be stored in the laser electronics 26. The user interface 30 may retrieve the images to display to a user to select, confirm or edit.

FIGS. 13A–13C illustrate examples of stripes created by the image processing module 1202 of FIG. 12. "Striping" refers to organizing an image (e.g., a list of points with an order of the points to be marked) of symbols or characters, such as "A B C," to a plurality of stripes or segments of data sets, as shown in FIGS. 13A–13C. The image processing module 1202 organizes an image to stripes in a direction perpendicular to the motion of the product 22 (FIG. 11A). In the description above, the product 22 travels horizontally with respect to the printing system 10 (FIGS. 3A–3C). Thus, the image processing module 1202 organizes an image into vertical stripes. FIGS. 13A and 13B show vertical stripes created for a product 22 that travels horizontally with respect to the printing system 10. FIG. 13A shows a top line of characters "A B C" and a bottom line of characters "1 2 3 ," which are organized to three vertical stripes 1306, 1304, 1302. FIG. 13B shows a top line of characters "1 2 3 4 ," a middle line of characters "A B," and a bottom line of characters "5 6 7 8 ," which are organized to six vertical stripes 1312–1322.

FIG. 13C shows a top line of characters "A B C" and a bottom line of characters "1 2 3 ," which are organized to two horizontal stripes 1332, 1334 for a product moving vertically with respect to the printing system 10.

The image processing module 1202 places each symbol or character in one stripe, and does not divide a symbol into multiple stripes. For example, the symbol "3 " in FIG. 13B is properly placed in one stripe 1314 and should not be divided into multiple stripes, such as stripes 1312 and 1314. If the symbol "3 " in FIG. 13B is divided into multiple stripes 1312 and 1314, the clipping correction module 1204 (described below) would improperly split the symbol "3 " and would not be able to achieve the corrected image in FIG. 14C.

Also, the image processing module 1202 avoids placing more than one symbol (along a horizontal line of symbols) into a single vertical stripe. For example, if "3 " and "4 " in FIG. 13B are put in one stripe, and "1 " and "2 " are put in another strip then the clipping correction "spreading" (described below) would result in an image of:

"1 2 3 4"

Figure 14C:
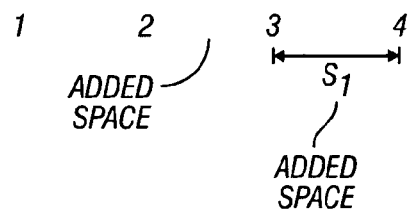
FIGS. 14C–14E illustrate examples of clipping correction.

If each symbol of a horizontal line of symbols (e.g., "1 2 3 4 " in FIG. 13B) are properly placed into its own vertical stripe, as shown in FIGS. 13A and 13B, then the clipping correction spreading described below would result in a properly corrected image, such as the image in FIG. 14C.

Each stripe may be assigned parameters, such as a print order and a "weight" based on size/width, location, number of pixels, and time to print the stripe. Weight may represent the time it takes to print a stripe. In one configuration, weight of a stripe is expressed as follows in units of time:

weight=(number of pixels in stripe)(dwell time per pixel)

Thus, the image processing module 1202 in FIG. 12 may output (a) a plurality of stripes 1208 for a particular image to be printed, (b) a print order of the stripes 1208, and (c) a weight of each stripe to the clipping correction module 1204.

In one configuration, the image processing module 1202 in FIG. 12 may send stripes 1208 for a particular print job to the clipping correction module 1204 at any time before the print job actually begins (i.e., "off-line" time, not real-time). In another configuration, the image processing module 1202 may send stripes 1208 for a particular print job to the clipping correction module 1204 in real-time.

Leading Edge Clipping Correction

FIG. 14A illustrates an example of a desired image to be printed. FIG. 14B illustrates an example of a printed image that is affected by "leading edge" clipping. "Leading edge" clipping may occur when (a) a product 22 is moving too fast past the laser print window or aperture 1502 (FIG. 15A), and the laser 12 cannot complete its printing, and/or (b) the printing system 10 needs a high laser dwell time (explained above) to print each pixel on a product's material, and the laser 12 cannot complete its printing. The left end of an image is "clipped" (FIG. 14B) by the leading edge 1506 (FIG. 15A) of the laser's aperture 1502, which limits the print beam 14 (FIG. 1A) from reaching a desired location on the moving product 22. In other words, the printing system 10 "runs out" of aperture when trying to print on a fast-moving product 22 or when a high dwell time is needed.

Figure 15A:
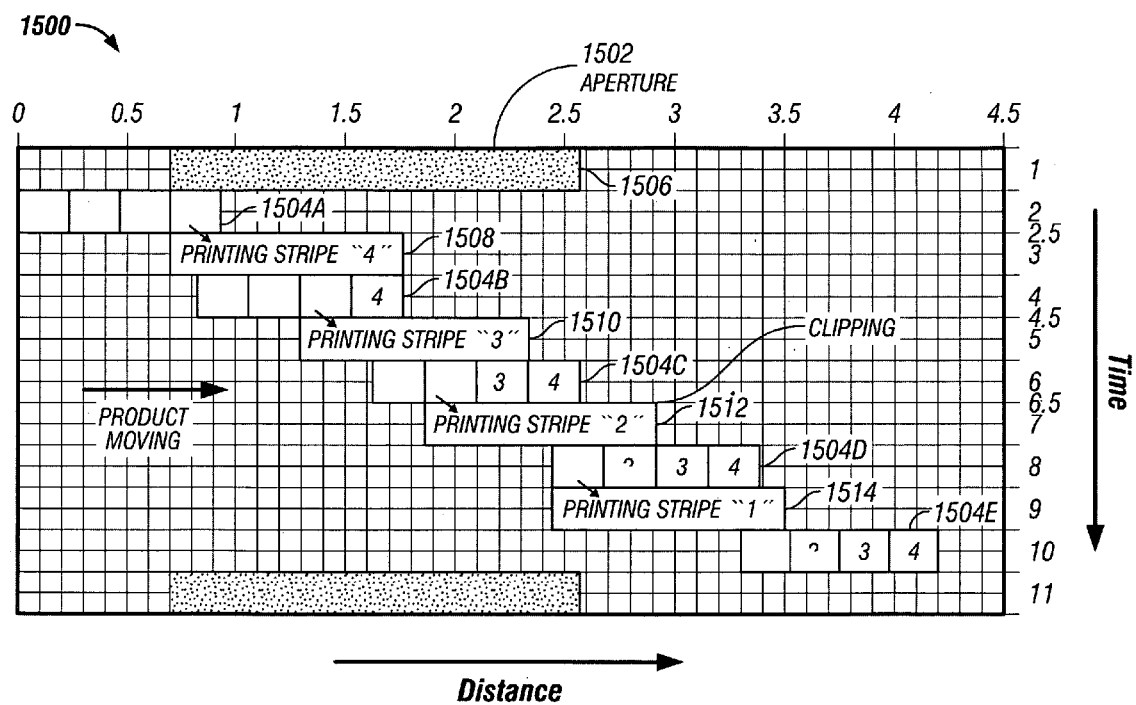
FIG. 15A illustrates an example of leading edge clipping.
Figure 15B:
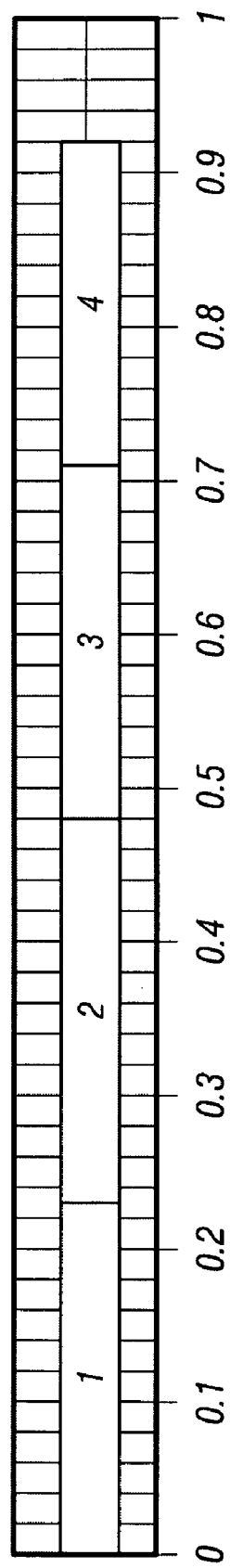
FIG. 15B illustrates a desired code "1 2 3 4 " to be printed in a desired print zone according to the distance scale in FIG. 15A.

FIG. 15A illustrates an example of leading edge clipping. In FIG. 15A, the location of a desired print zone 1504 on a product moves from left to right past a printing aperture 1502 as time transpires (vertical axis). The time axis (vertical axis) in FIG. 15A may be in seconds, microseconds or any other desired units. Distance is measured on the horizontal axis in microns, DAC (digital-to-analog converter) steps or any other desired units. FIG. 15B illustrates the intended code "1 2 3 4 " to be printed in the desired print zone 1504 according to the distance scale in FIG. 15A. The print zones 1504A–1504E in FIG. 15A may be considered snapshots in time.

At time 2.5 in FIG. 15A, a portion of the print zone 1504A has entered the aperture 1502, and the printing system 10 begins to print the fourth stripe "4 " (process block 1508). The block 1508 represents a total time (vertically) and a total linear distance (horizontally) needed to print the fourth stripe "4 " in real time. At time 4.5, the full print zone 1504B is within the aperture 1502, and the printing system 10 begins to print the third stripe "3 " (process block 1510). At time 6.5, the full print zone 1504C is still within the aperture 1502, and the printing system 10 begins to print the second stripe "2 " (process block 1512). But before the printing system 10 can finish printing the second stripe "2 ," the print zone 1504D has moved past a leading edge 1506 of the aperture 1502. Thus, the second stripe "2 " is clipped. This is known as "leading edge clipping." The printing system 10 cannot print the first stripe "1 " in the desired print zone 1504E because the print zone 1504E has moved past the aperture 1506.

The clipping correction module 1204 of FIG. 12 prevents "leading edge" clipping and ensures that an entire image (FIG. 14C) is printed. The trigger input 1210 comes from the print trigger (sensor) 38 (described above with reference to FIGS. 3A–3C and 11A), which senses a leading edge of a product 22. When the clipping correction module 1204 receives a trigger input 1210 to print a new job, this job is put into a clipping correction processing queue 1205. The clipping correction module 1204 continually polls the queue 1205 and runs clipping correction on the next job ready to print. In one embodiment, the clipping correction module 1204 only uses the stripes 1208 and velocity 1212, and does not calculate time. The queue 1205 allows a trigger to be received while the clipping correction module 1204 is running clipping correction for a previously triggered print job. The clipping correction module 1204 calculates a Clipping Correction Value (described below) for a code (sequence of symbols) to be printed in "real-time." Once the clipping correction module 1204 finishes the print job from the last trigger, it will start running clipping correction for the next print job in the queue 1205.

The printing routines/drivers 1206 and laser 12 know when to start printing by tracking the distance of a product using an "encoder" 41 in FIG. 11A. The encoder 41 may include a cylinder (with mechanical and electrical parts) and a wheel attached or in contact with the moving product line 36 in FIG. 11A. The encoder 41 may be coupled to the laser 12 and/or electronics 26 via a cable and send signals to the laser 12 and/or the electronics 26. The encoder 41 may track speed and distance, which includes the distance d1+d2 between the trigger eye/sensor 38 and the center of the aperture 14 in FIG. 11A. The user sets the trigger distance while taking into account the desired location of the print zone 34 on the product 22. Given the desired print zone 34 on the product 22 in FIG. 11A, left of the laser unit 10, the trigger distance plus distance to the print zone may be expressed as d1+d2+d3. The laser 12 will start to print when the product's position has traveled the "Trigger Distance" (set by the user) minus the "Start Offset" set by the clipping correction module 1204 from the trigger location. The user may input the "Trigger Distance" (e.g., d1+d2 in FIG. 11A between the print trigger 38 and a center of the aperture 1502 in FIG. 15A of the printing system 10) into the electronics 26 (FIGS. 1B and 12).

A user or technician may input a length of the product 22 into the electronics 26, or alternatively, the printing system 10 may sense the length of the product 22 and store the length in the electronics 26. In another configuration, neither the user nor the electronics enters the length of the product. The electronics 26 does not know the length of the product 22, and the clipping correction module 1204 does not know if the clipping correction value pushes/spreads the stripes past the length of the product. If this happens then some of the stripes will simply miss the product.

The clipping correction module 1204 also receives a velocity input 1212 from the speed sensor 42 (e.g., encoder 41) in FIGS. 3B–3C. As described above, the speed sensor 42 senses the speed of the product 22 on the product line 36. The clipping correction module 1204 of FIG. 12 uses the known distance of the product 22 (d1+d2 in FIG. 11A) when the trigger input 1210 is received and the velocity input 1212 in the following equation to calculate the time when the product 22 will be in front of the aperture 1502:

product velocity=product's change in distance/
change in time for a Stripe n:

Stripe Print Time$_n$=(Number Of Points in Address Space of electronics 26)* (Dwell Time Per Point In Stripe)

"Stripe Print Time" may be used to find "Stripe Travel Distance":

Stripe Travel Distance$_n$=Stripe Print Time*Velocity

"Stripe Travel Distance" may be used to find "Trailing Edge Clipping Position" and "Lead Edge Clipping Position" of the stripe:

TEC$_n$(Trailing Edge Clipping Position of Stripe $n$)=Stripe Static TEC Position+$\Sigma$(from $i$=0 up to $i$=($n$–1)) [Stripe Travel Distance$_i$]

"Stripe Static TEC Position" is the trailing edge of the stripe if the entire code was printed in the aperture with zero velocity. This means every stripe had zero "Stripe Travel Distance." For example, if the print zone 1504A in FIG. 15A was centered in the aperture 1502, then the left side of each stripe is the "static TEC," and the right side of each stripe is the "static LEC."

An example of $\Sigma$(from $i$=0 up to $i$=(n–1)) [Stripe Travel Distance$_i$] where n=2 and n=3 is now described. For TEC$_2$ (TEC value of stripe 2 (n=2) in FIG. 15B), the clipping correction module 1204 takes the "static TEC" of stripe 2 and adds the travel distance of all previous stripes, which is the stripe travel distance of stripe 1. For TEC$_3$ (TEC value of stripe 3 (n=3) in FIG. 15B), the clipping correction module 1204 takes the "static TEC" for stripe 3 and adds the travel distance of all previous stripes, which is the stripe travel distances of stripes 1 and 2.

LEC$_n$(Lead Edge Clipping Position of Stripe
$n$)=TEC$_n$–Stripe Width$_n$–Stripe Travel Distance$_n$ "LEC" may be used to find "Start Offset" (described below):

Start Offset (Starting Position of Entire Print in Aperture)=Maximum LEC–Aperture Size.

The "Clipping Correction Value" (described below) may be calculated as follows:

Clipping Correction Value=$\Sigma$(from $k$=0 up to $k$=(Total Number of Stripes–2))[$\Sigma$(from $j$=(Total Number of Stripes–1)down to $j$=$k$)[(LEC$_j$–TEC$_k$–Aperture Size)/($j$–$k$)]]

Where $\Sigma$ represents a summation with j, and k as integer variables in the formula. The equation adds the result of (LEC$_j$–TEC$_k$–Aperture Size)/(j–k) when k=0 and j=(Total Number of Stripes–1) with the result of (LEC$_j$–TEC$_k$–Aperture Size)/(j–k) when k=0 and j=((Total Number of Stripes–1)–1), and so on until j=k=0. The equation takes that value and adds it to the result of the same process with k=1. The equation repeats this until k reaches (Total Number of Stripes–2).

The clipping correction module 1204 uses (a) the weight of the stripes (time) and (b) the velocity input 1212 (V=distance/time) from the speed sensor 42 (e.g., the encoder 41) to calculate a minimal amount of "spreading" between printing consecutive/adjacent stripes to fit every stripe in a desired print zone on the product. The result of Time x (Distance/Time) is distance. "Spreading" allows each stripe to be printed on the product 22 (FIG. 14C) as the product 22 passes through the aperture 1502 (FIG. 15A). Spreading adds equal visual spaces S1 (FIG. 14C) between adjacent stripes such that adjacent stripes are equidistant across an entire printed image. The reason for spreading is to push all stripe print zones back into the aperture by an equal amount while they are printing. This prevents the stripes from running into the aperture wall and clipping (FIG. 14B). Pushing the print zones of the stripes back in the aperture results in visual spaces between the stripes seen on the product. The added spaces S1, S2, S3 shown in FIGS. 14C–14E may appear exaggerated compared to actual added spaces to better illustrate clipping correction spreading.

Figure 15C:
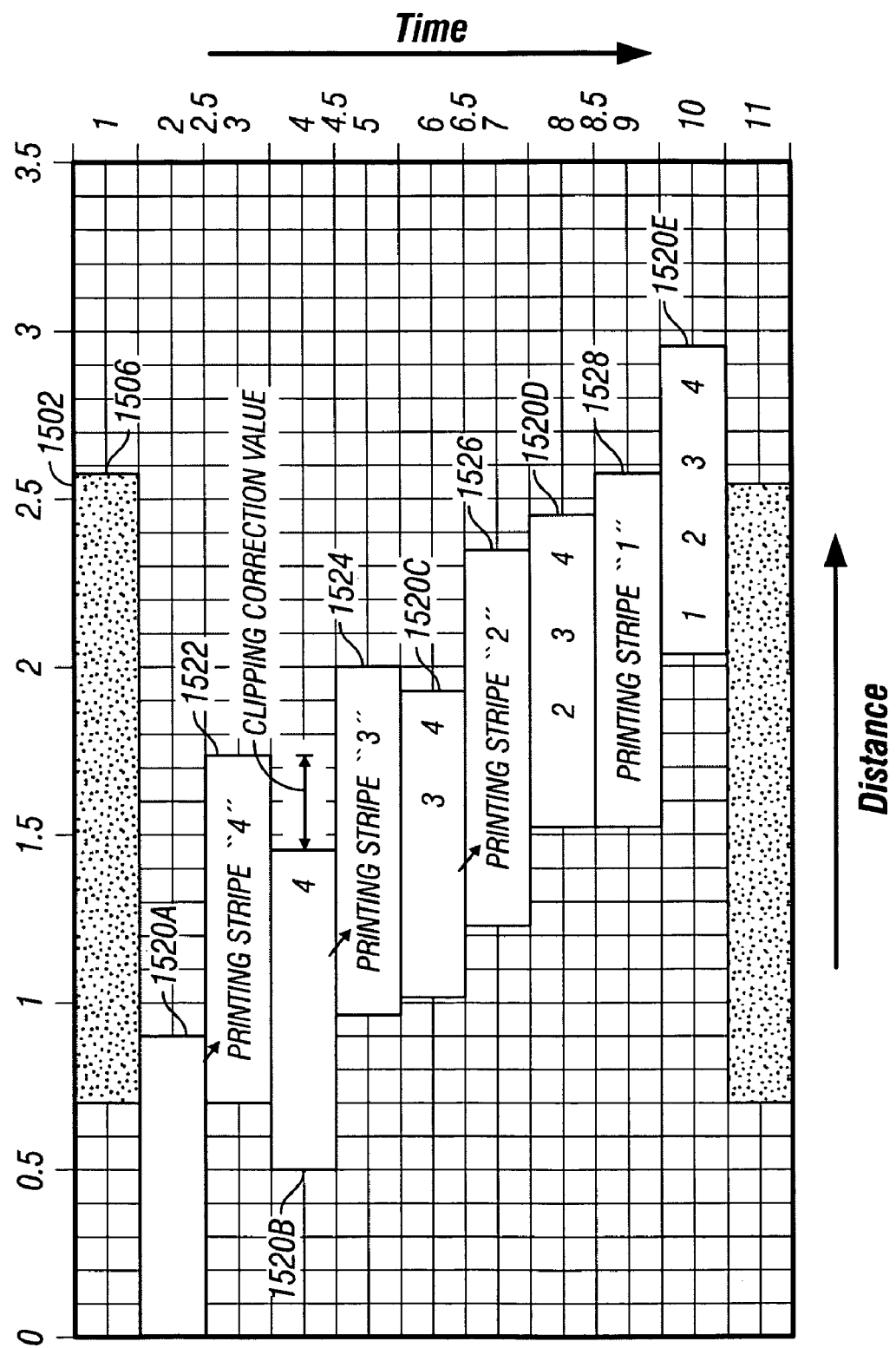
FIG. 15C illustrates an example of leading edge clipping correction.

FIG. 15C illustrates an example of leading edge clipping correction and spreading. The clipping correction module 1204 takes the final locations of all stripe print zones (with clipping correction), centers them in the aperture 1502, and determines the "Start Offset." The "Start Offset" is the distance between the original start location of the leading stripe in the aperture (generated by the image processing module 1202) and the position of the leading stripe's final start location after clipping correction. The leading stripe is the first stripe (e.g., "4" in FIG. 15C) that would enter the aperture 1502 as if the first stripe was a target on a moving product.

All the stripes are moved back into the aperture 1502 by an equal amount equal to the Clipping Correction Value (described above) in units of distance or length. For example, the printing system 10 moves the desired location on the product 22 where the third stripe "3 " will be printed to the left by the Clipping Correction Value. As a result, the clipping correction module 1204 moves locations where stripes "2 " and "1 " will be printed back into the aperture 1502. The length of the aperture 1502 is accessible or programmed into the clipping correction module 1204.

At time 2.5 in FIG. 15C, a sufficient portion of the print zone 1520A enters the aperture 1502 for the printing system 10 to begin printing the fourth stripe "4 " (process block 1522). Block 1522 represents a total time (vertically) and a total linear distance (horizontally) to print the fourth stripe "4 " in real time. At time 4.5, a larger portion of the print zone 1520B is within the aperture 1502, and the printing system 10 begins to print the third stripe "3 " (process block 1524). At time 6.5, the full print zone 1520C is within the aperture 1502, and the printing system 10 begins to print the second stripe "2 " (process block 1526). At time 8.5, the full print zone 1520D is still within the aperture 1502, and the printing system 10 begins to print the first stripe "1 " (process block 1528). At time 9.5, all four stripes "1 2 3 4 " have been printed in the print zone 1520E, which has moved partially outside the aperture 1502.

Figure 15D:
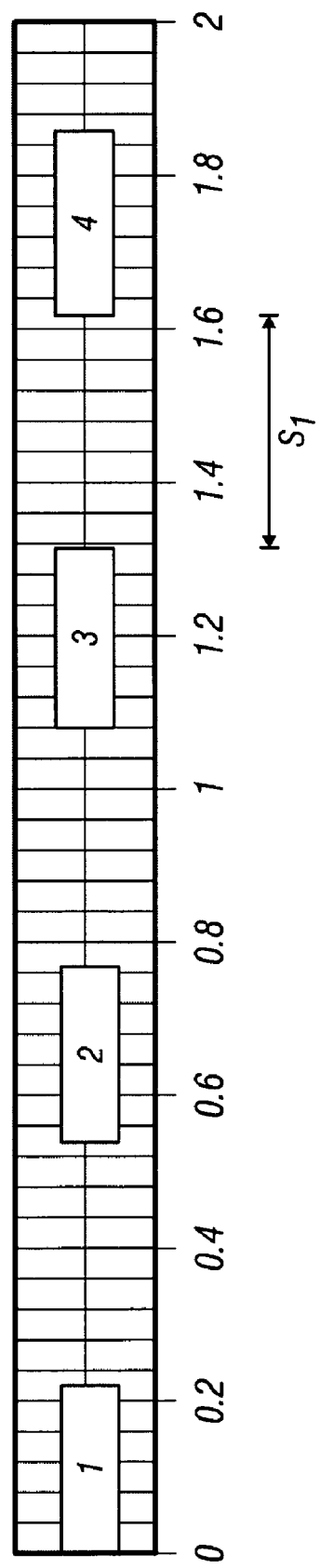
FIG. 15D illustrates the corrected code "1 2 3 4 " printed in the desired print zone according to the distance scale in FIG. 15C.

FIG. 15D illustrates the corrected (spread) code "1 2 3 4 " printed in the desired print zone 1520E according to the distance scale in FIG. 15C. The corrected (spread) code "1 2 3 4 " of FIG. 15D is longer than the initial intended code in FIG. 15B due to the added spaces, but each stripe is legible in FIG. 15D with no clipping.

Even if the weight of each stripe is different, the space S1 (FIGS. 14C and 15D) between each symbol may be the same.

The clipping correction module 1204 may calculate the minimum space S1 to fit all the stripes in the desired print zone 1520 and use as little space on the product as possible. Minimizing the space S1 improves legibility of the sequence of symbols and limits distortion.

The clipping correction module 1204 outputs the Start Offset value to the printing routines/drivers 1206. The printing routines/drivers 1206 are tracking the encoder 41 (FIG. 11A) to know when to start printing. The start offset value will cause the printing routines/drivers 1206 to start printing sooner than the "Trigger Distance" (set by the user) by an amount equal to the "start offset." The clipping correction module 1204 also outputs another value to the real-time printing routines/drivers 1206: the Clipping Correction Value, which indicates the offset for in-between stripes (FIGS. 14C, 15C and 15D)) to adjust for clipping while printing. The printed image of FIG. 14C may be spread horizontally, but it is still readable.

Figure 15E:
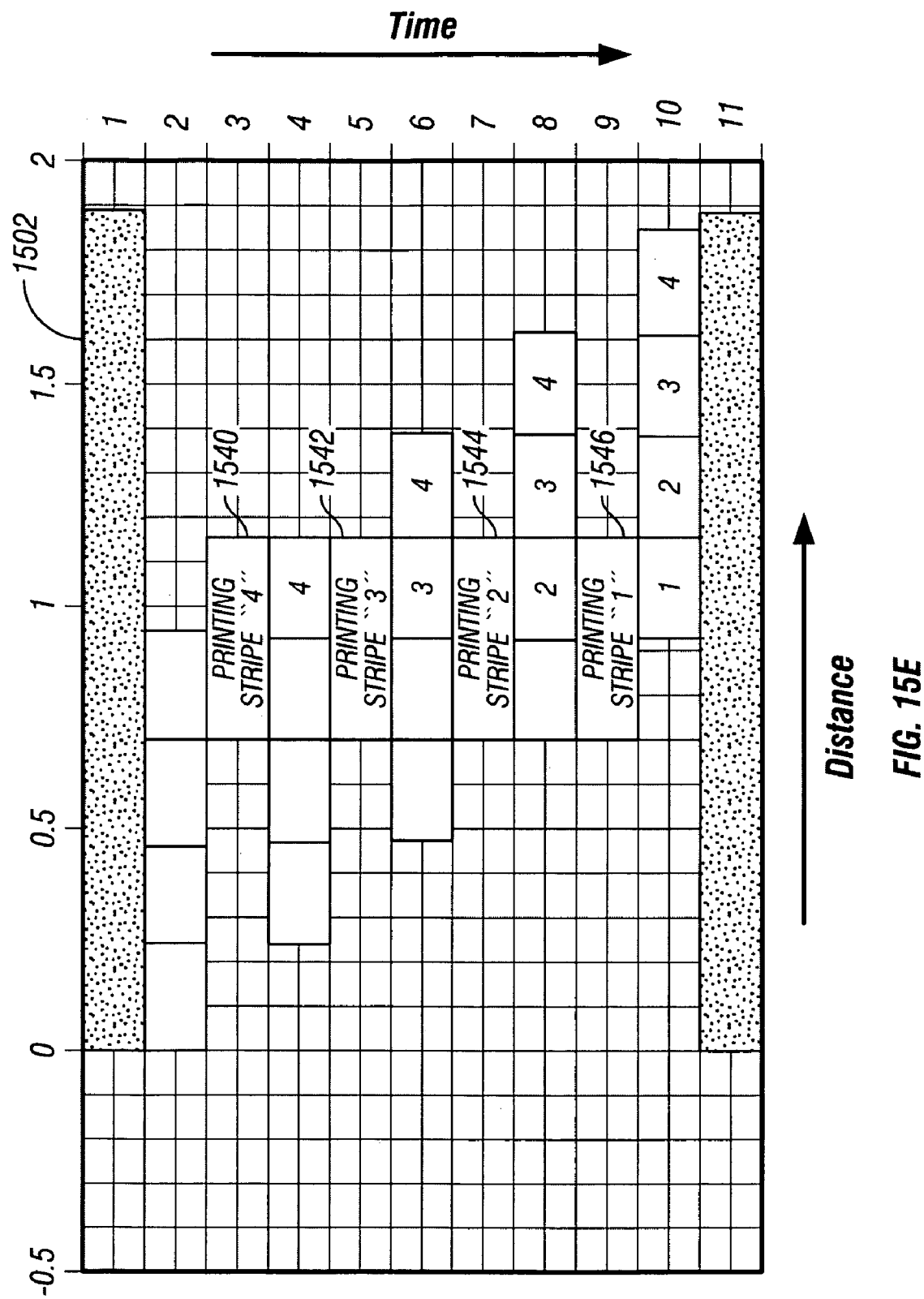
FIG. 15E illustrates clipping correction configured to enable a laser to be mostly centered in an aperture while printing four stripes "1 2 3 4."

FIG. 15E illustrates clipping correction (process blocks 1540–1546) configured to enable a laser to be mostly centered in an aperture 1502 while printing four stripes "1 2 3 4."

Trailing Edge Clipping Correction

"Trailing edge clipping" may occur when the printing system 10 tries to (a) print an image on a product 22 that is moving too slow, and/or (b) print a long horizontal image on a product 22, e.g., total length of image is longer than the aperture 1502. The desired print location on the product 22 to print a symbol of the image does not enter the aperture 1502 (FIG. 16A) on time as expected, and the "trailing edge" 1600 of the aperture 1502 limits the print beam 14 from reaching the desired location on the product 22. As a result, one or more symbols of the image are printed in the wrong location on the product 22 or symbols are printed on top of each other (overlapping symbols), as shown in FIG. 16A.

Figure 16A:
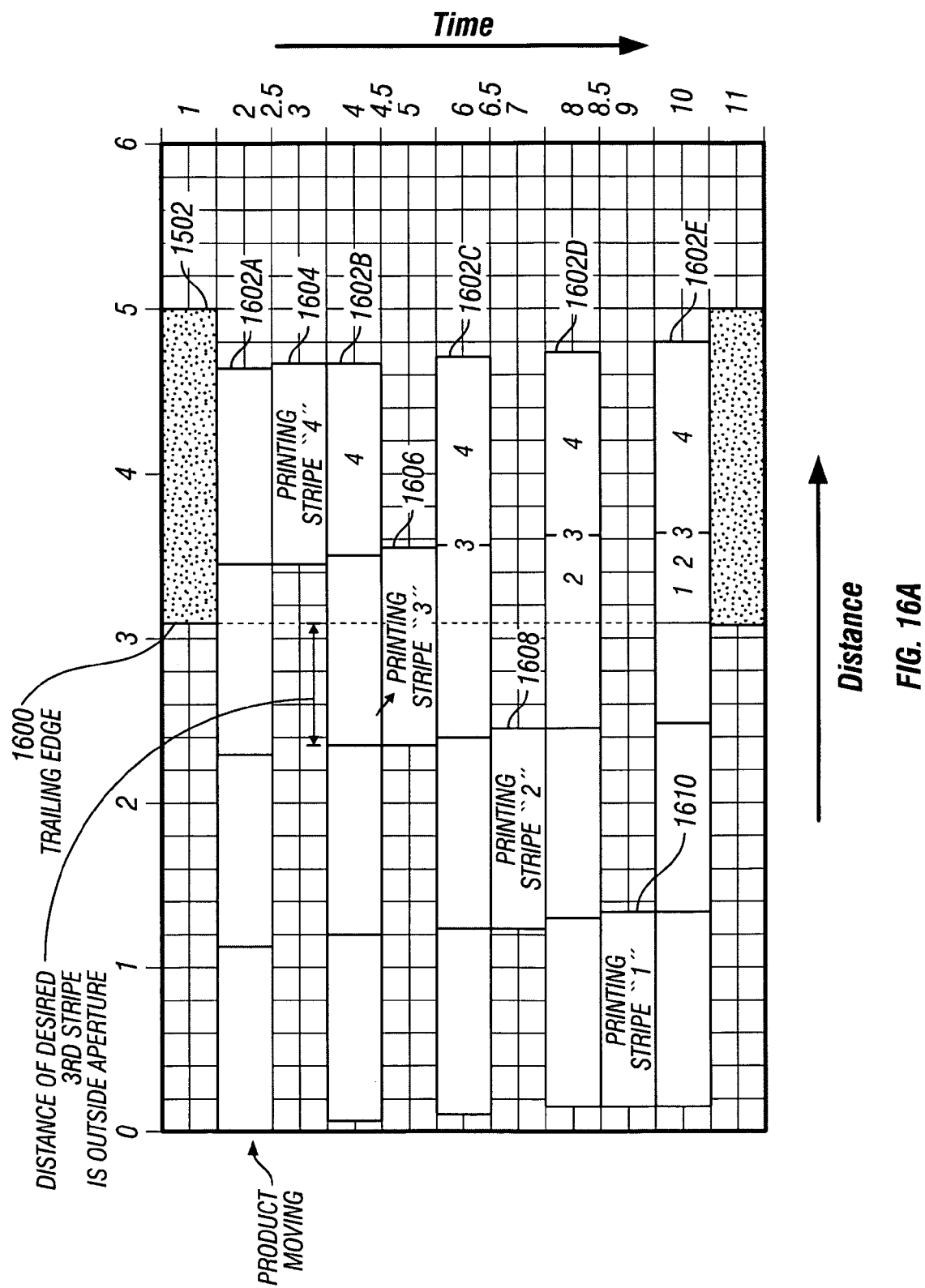
FIG. 16A illustrates an example of trailing edge clipping.
Figure 16B:
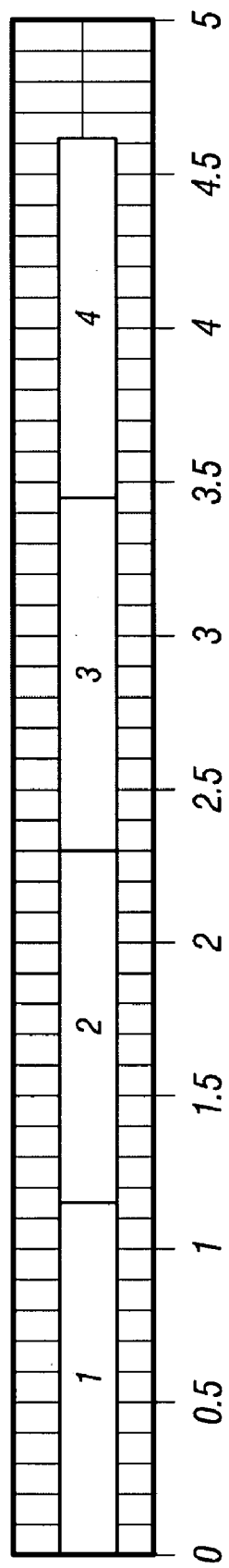
FIG. 16B illustrates a desired code "1 2 3 4 " to be printed in the desired print zone according to the distance scale in FIG. 16A.

FIG. 16A illustrates an example of trailing edge clipping. In FIG. 16A, the location of a desired print zone 1602 on a product moves from left to right past a printing aperture 1502 as time transpires (vertical axis). The time axis (vertical axis) in FIG. 16A may be in seconds, microseconds or any other desired units. Distance is measured on the horizontal axis in microns, DAC (digital-to-analog converter) steps or any other desired units. FIG. 16B illustrates the intended code "1 2 3 4 " to be printed in the desired print zone according to the distance scale in FIG. 16A.

At time 2.5 in FIG. 16A, a sufficient portion of the print zone 1602A has entered the aperture 1502 for the printing system 10 to print the fourth stripe "4 " (process block 1604). The block 1604 represents a total time (vertically) and a total linear distance (horizontally) needed to print the fourth stripe "4 " in real time. At time 4.5, the print zone 1602B has only moved slightly more within the aperture 1502 compared to the print zone 1602A at time 2.5. The desired location to print the third stripe "3 " has not fully entered the aperture 1502. The printing system 10 begins to print the third stripe "3 " (process block 1606). The third printed stripe "3 " may overlap the fourth printed stripe "4 ." This is known as "trailing edge clipping." At time 6.5, the print zone 1602C has only moved slightly more within the aperture 1502 compared to the print zone 1602B at time 4.5. The printing system 10 begins to print the second stripe "2 " (process block 1608). The second printed stripe "2 " may overlap the third printed stripe "3 ." At time 8.5, the print zone 1602D has only moved slightly more within the aperture 1502 compared to the print zone 1602C at time 6.5. The printing system 10 begins to print the first stripe "1 " (process block 1610). The first printed stripe "1 " may overlap the second printed stripe "2."

Figure 16C:
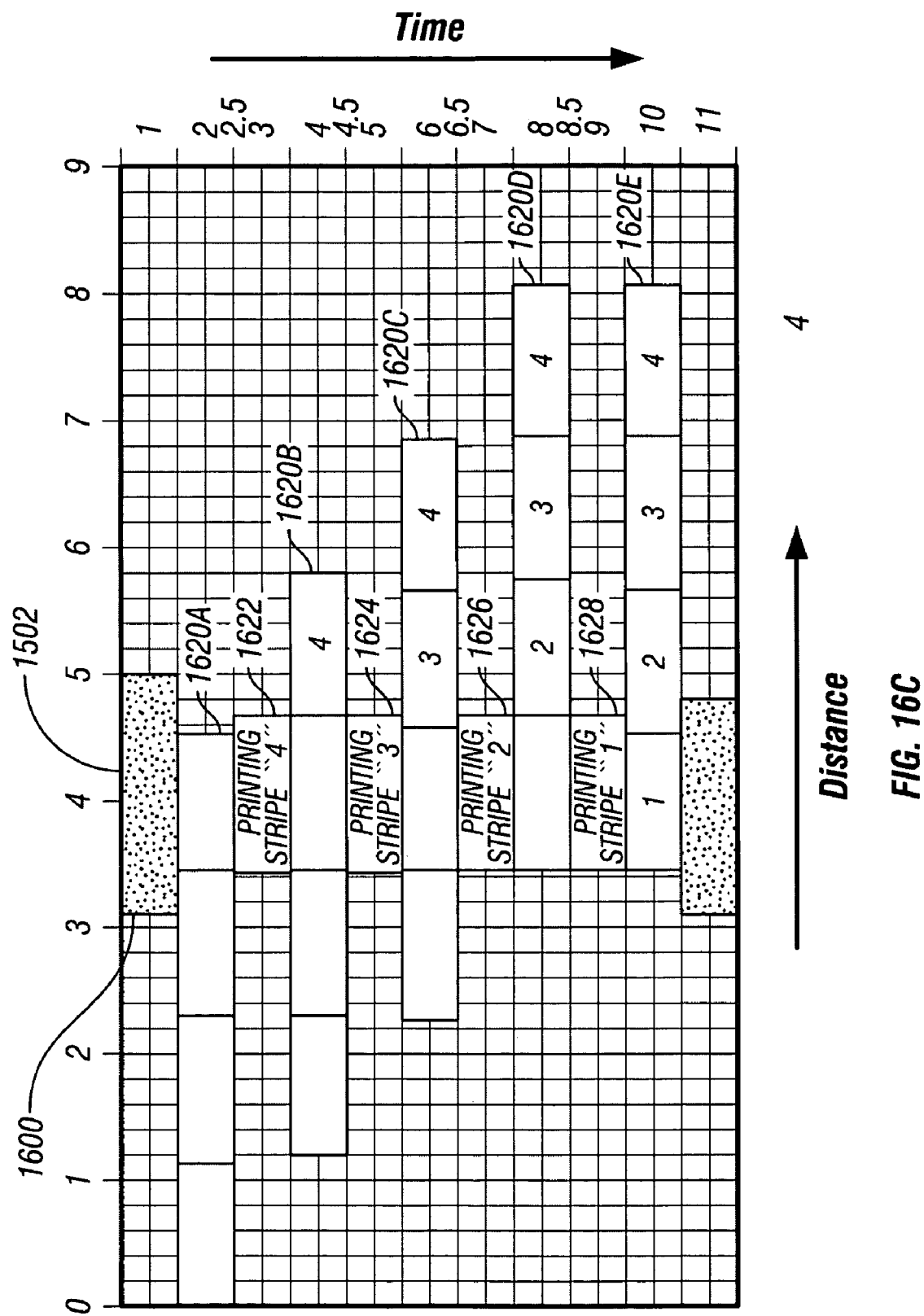
FIG. 16C illustrates an example of trailing edge clipping correction and adding delays.

FIG. 16C illustrates an example of trailing edge clipping correction, which adds time delays between printing stripes. The clipping correction module 1204 provides real-time trailing edge clipping correction to print stripes on a product 22 moving at a slow speed or to print stripes of codes that are longer than the aperture 1502. Trailing edge clipping correction turns off the laser 12 and delays printing until a proper location (print zone for a stripe) on the product 22 has entered the aperture 1502. The clipping correction module 1204 uses the following equation to derive a time delay when a desired print zone will enter the aperture 1502:

time delay=(distance outside aperture)/velocity of product

In one configuration, the clipping correction module 1204 adds time delays to start printing a stripe when the desired stripe location is substantially centered in the aperture 1502.

At time 2.5 in FIG. 16C, a sufficient portion of the print zone 1620A enters the aperture 1502 for the printing system 10 to begin printing the fourth stripe "4 " (process block 1622). Block 1622 represents a total time (vertically) and a total linear distance (horizontally) to print the fourth stripe "4 " in real time. At time 4.5, a sufficient portion of the print zone 1620B is within the aperture 1502 for the printing system 10 to begin printing the third stripe "3 " (process block 1624). At time 6.5, a sufficient portion of the print zone 1620C is within the aperture 1502 for the printing system 10 to begin printing the second stripe "2 " (process block 1626). At time 8.5, a sufficient portion of the print zone 1620D is within the aperture 1502 for the printing system 10 to begin printing the first stripe "1 " (process block 1628). At time 9.5, all four stripes "1 2 3 4 " have been printed in the print zone 1620E, which has moved partially outside the aperture 1502.

The result of the trailing edge clipping correction in FIG. 16C is the same as the desired image to be printed in FIG. 16B. There are no added spaces.

The distance that the product 22 travels while printing a stripe is equal to the stripe width with clipping correction.

Update Clipping Correction

Figure 14D:
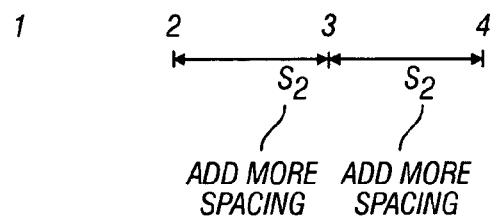

After the leading edge of the product 22 has moved past the trigger 38 (FIG. 11A), the clipping correction module 1204 or the real-time printing routines/drivers 1206 may reevaluate the velocity input 1212 between every printed stripe. If the velocity of the product has changed, the clipping correction module 1204 updates the Clipping Correction Value in real-time. For example, if the clipping correction module 1204 senses that the velocity of the product 22 has increased while or after the laser 12 prints the "4 " in FIG. 14C, the clipping correction module 1204 may update, i.e., increase, the Clipping Correction Value to increase spreading. FIG. 14D shows increased spreading due to updated clipping correction. Each printed symbol in FIG. 14D is now separated by an equal space S2, which is larger than space S1. The time to print the image in FIG. 14C is the same as the time to print the image in FIG. 14D, since the velocity of the product and the distance of the image have changed in FIG. 14D.

Figure 14E:
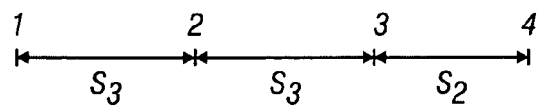

If the clipping correction module 1204 senses that the velocity of the product 22 has increased again while or after the laser 12 prints the "3 " in FIG. 14D, the clipping correction module 1204 may further update, i.e., further increase, the Clipping Correction Value to increase spreading. FIG. 14E shows increased spreading due to update clipping correction. Space S3 between "2 " and "3 " is larger than space S2 between "4 " and "3 " to accommodate the increased velocity sensed during or after printing of "3." Thus, the clipping correction module 1204 attempts to insert equal spaces (S1 in FIG. 14C or S2 in 14D) or insert increased spaces (S2 and S3 in FIG. 14E) between adjacent stripes.

In one configuration, the clipping correction module 1204 does not reduce spreading if the sensed velocity of the product 22 decreases. For example, if the clipping correction module 1204 senses that the velocity of the product 22 is decreasing while or after the laser 12 prints the "3 " in FIG. 14D, the clipping correction module 1204 does not decrease the Clipping Correction Value sent to the printing routines/drivers 1206. The printing system 10 will still print the image in FIG. 14D with equal spaces S2 between characters. Thus, spacing between characters may increase but not decrease to preserve the highest quality image, in this configuration of the printing system 10.

If the velocity of the product decreases, the clipping correction module 1204 adds a time delay to wait for a desired print zone to enter the aperture 1502 before printing the next symbol.

Figure 18A:
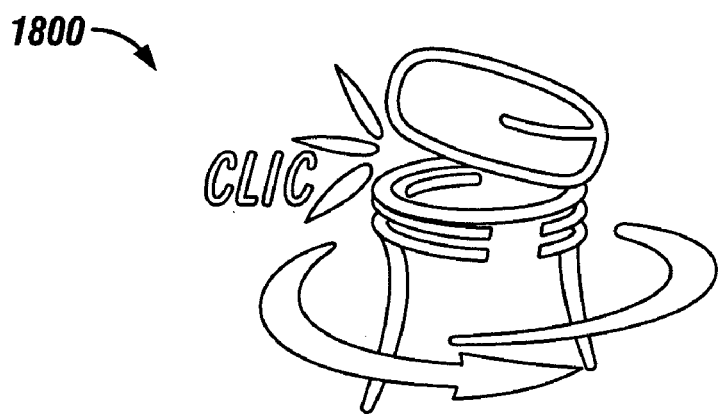
FIGS. 18A–18C illustrate examples of a sign, a bar code and a company logo, respectively, which may be marked with the software modules and electronics in FIG. 12.
Figure 18B:
Figure 18C:

FIGS. 18A–18C illustrate examples of a sign 1800, a bar code 1802 and a company logo 1804, respectively, which may be marked with the software modules and electronics in FIG. 12. The software modules and electronics in FIG. 12 may print other signs, bar codes, logos and images using the striping methods described above.

Although the present application has been described in detail, it should be understood that various changes, combinations, substitutions and alterations can be made hereto without departing from the spirit and scope of the application as described by the appended claims.

What is claimed is:

1. A system comprising:
  a laser source to print an image on a moving object;
  an input module to receive information identifying a velocity of the moving object and a location of the moving object; and
  a processor to perform operations including:
    separate an image to be printed on the moving object into a plurality of stripes that collectively represent the image to be printed;
    based on one or more of (a) the velocity of the moving object, (b) the location of the moving object, and (c) a parameter of a stripe to be printed, determine at least one of a time to print the stripe and a location on the moving object at which to print the stripe;
    control the laser source to print the stripe on the moving object according to at least one of the time and location values; and
    calculate a clipping correction value and using the clipping correction value to control printing by the laser source on the moving object.

2. The system of claim 1, further comprising a sensor adapted to sense an object moving past the sensor, the sensor providing said information identifying a location of the moving object.

3. The system of claim 1, wherein the location of the moving object comprises a pro-determined distance away from system.

4. The system of claim 1, wherein the time to print comprises a print start time.

5. The system of claim 1, wherein the location at which to print comprises a print start location.

6. The system of claim 1, wherein the parameter of the stripe to be printed comprises one or more of a print order, a stripe size, a stripe location, and a number of pixels.

7. The system of claim 1, wherein the processor repeats the determining and print controlling for each of the stripes collectively representing the image.

8. The system of claim 1, wherein the processor varies at least one of time and location to print between printing of successive stripes.

9. A system comprising:
  a first module to organize an image to a plurality of stripes;
  a second module to receive the stripes, a trigger input and a velocity input to
    determine at least one of (a) locations on a moving object to print the stripes, and (b)
  a time at which to print at least one stripe on the moving object; and
    calculate a clipping correction value; and
  a laser source to print the stripes on the moving object, wherein at least the clipping correction value is used to control printing by the laser source on the moving object.

10. The system of claim 9, further comprising a processor and a storage medium, wherein the first module and second modules are stored in the medium and executable by the processor.

11. The system of claim 9, wherein the image comprises a sequence of symbols, the first module separates symbols of the image into a plurality of stripes, each stripe comprising at least one whole symbol.

12. The system of claim 9, wherein the first module separates symbols of the image into a plurality of stripes, each stripe comprising a plurality of whole symbols with substantially a same position in a direction orthogonal to a direction of motion of the moving object.

13. The system of claim 9, further comprising a sensor to detect a location of the moving object.

14. The system of claim 9, further comprising a sensor to detect a velocity of the moving object.

15. The system of claim 9, wherein the trigger input indicates a time when the moving object is at a predetermined distance from the system.

16. The system of claim 9, further comprising a third module to receive an output from the second module to control the laser source.

17. The system of claim 16, wherein the second module sends the clipping correction value to the third module, the second module being adapted to output an updated clipping correction value to the third module when the velocity input changes.

18. The system of claim 9, wherein the second module calculates a start offset distance on the object to print a first stripe.

19. The system of claim 9, wherein the second module calculates a distance on the object between printing consecutive stripes.

20. The system of claim 9, wherein the second module calculates a time delay between printing consecutive stripes.

21. The system of claim 9, wherein the laser source is less than 30 Watts.

22. A method comprising:
organizing an image to be printed into a plurality of stripes that collectively represent the image;
based on one or more of (a) a velocity of a moving object, (b) a location of the moving object, and (c) a parameter of a stripe to be printed, determining at least one of a time to print the stripe and a location on the moving object at which to print the stripe;
printing the stripe with a laser beam on the moving object based on at least the determined time to print and the location; and
calculating a clipping correction value and using the clipping correction value to control printings the laser beam on the moving object.

23. The method of claim 22, farther comprising receiving input relating to at least one of the velocity of the moving object and the location of the moving object.

24. The method of claim 22, further comprising receiving an input indicating the location of the moving object.

25. The method of claim 22, wherein the determined location comprises a starting location for printing.

26. The method of claim 22, wherein the determined time comprises a starting time for printing.

27. The method of claim 22, wherein the parameter of the stripe to be printed comprises one or more of a print order, a stripe size, a stripe location, and a number of pixels.

28. The method of claim 22, further comprising repeating the determining and printing for each of the stripes collectively representing the image.

29. The method of claim 22, wherein print location/time are varied between printing of successive stripes.

30. The method of claim 22, wherein the image to be printed is a list of points with an order of the points to be marked.

31. The method of claim 22, further comprising further comprising receiving a print command from a user interface and setting up a print job as an image.

32. The method of claim 22, further comprising determining whether a velocity of the object has changed, and if the velocity has changed, further modifying at least one of (a) a location on the moving object to print at least stripe, and (b) a time to print at least stripe on the moving object.

33. The method of claim 22, wherein the image comprises a sequence of symbols.

34. The method of claim 22, further comprising separating symbols of the image into a plurality of stripes, each stripe comprising at least one whole symbol.

35. The method of claim 22, further comprising separating symbols of the image into a plurality of stripes, each stripe comprising a plurality of whole symbols with substantially a same position in a direction orthogonal to a direction of motion of the moving object.

36. The method of claim 22, further comprising detecting a location of the moving object.

37. The method of claim 22, further comprising detecting a velocity of the moving object.

38. The method of claim 22, further comprising steering a beam from the laser.

39. The method of claim 22, further comprising generating an updated clipping correction value when the velocity input changes.

40. The method of claim 22, further comprising calculating a start offset distance on the object to print a first stripe.

41. The method of claim 22, further comprising calculating a time delay between printing consecutive stripes.

42. The method of claim 22, further comprising calculating a leading edge correction value.

43. The method of claim 22, further comprising calculating a trailing edge correction value.

* * * * *